(12) United States Patent
Kember et al.

(10) Patent No.: US 11,851,525 B2
(45) Date of Patent: *Dec. 26, 2023

(54) METHOD FOR PREPARING POLYETHER CARBONATES

(71) Applicant: Econic Technologies Ltd., Macclesfield (GB)

(72) Inventors: Michael Kember, Macclesfield (GB); Carly Anderson, Macclesfield (GB); Emma Hollis, Macclesfield (GB)

(73) Assignee: ECONIC TECHNOLOGIES LIMITED, Macclesfield (GB)

( * ) Notice: Subject to any disclaimer, the term of this patent is extended or adjusted under 35 U.S.C. 154(b) by 431 days.

This patent is subject to a terminal disclaimer.

(21) Appl. No.: 16/487,947

(22) PCT Filed: Mar. 1, 2018

(86) PCT No.: PCT/EP2018/055046
§ 371 (c)(1),
(2) Date: Aug. 22, 2019

(87) PCT Pub. No.: WO2018/158366
PCT Pub. Date: Sep. 7, 2018

(65) Prior Publication Data
US 2019/0382528 A1    Dec. 19, 2019

(30) Foreign Application Priority Data
Mar. 1, 2017 (GB) ...................................... 1703324

(51) Int. Cl.
*C08G 64/34* (2006.01)
*C08G 64/18* (2006.01)

(52) U.S. Cl.
CPC .................................. *C08G 64/34* (2013.01)

(58) Field of Classification Search
None
See application file for complete search history.

(56) References Cited

U.S. PATENT DOCUMENTS

| | | |
|---|---|---|
| 3,427,256 A | 2/1969 | Milgrom |
| 4,500,704 A | 2/1985 | Kruper, Jr. et al. |
| 4,826,953 A | 5/1989 | Kuyper et al. |
| 5,158,922 A | 10/1992 | Hinney et al. |
| 5,482,908 A | 1/1996 | Le-Khac |
| 5,536,883 A | 7/1996 | Le-Khac |
| 5,693,584 A | 12/1997 | Le-Khac |
| 5,780,584 A | 7/1998 | Le-Khac et al. |
| 5,783,513 A | 7/1998 | Combs et al. |
| 6,291,388 B1 | 9/2001 | Hofmann et al. |
| 6,486,361 B1 | 11/2002 | Ehlers et al. |
| 6,608,231 B1 | 8/2003 | Ooms et al. |
| 6,699,961 B2 | 3/2004 | Eleveld et al. |
| 6,716,788 B2 | 4/2004 | Eleveld et al. |
| 6,835,687 B2 | 12/2004 | Hofmann et al. |
| 6,977,236 B2 | 12/2005 | Eleveld et al. |
| 7,008,900 B1 | 3/2006 | Hofmann et al. |
| 7,034,103 B2 | 4/2006 | Combs |
| 7,811,958 B2 | 10/2010 | Bohres et al. |

(Continued)

FOREIGN PATENT DOCUMENTS

| | | |
|---|---|---|
| EP | 292772 A | 11/1988 |
| EP | 1529566 A | 5/2005 |

(Continued)

OTHER PUBLICATIONS

Wang et al., "Facile synthesis of poly(ether carbonate)s via copolymerization of CO2 and propylene oxide under combinatorial catalyst of rare earth ternary complex and double metal cyanide complex" published Oct. 28, 2011; Journal of Polymer Science Part A Polymer Chemistry, vol. 50, pp. 362-370. [Abstract provided downloaded from https://onlinelibrary.wiley.com/doi/abs/10.1002/pola.25040 on Oct. 28, 2019; 5 pages].

International Preliminary Report on Patentability for International Application No. PCT/EP2018/055046; 7 pages; dated Sep. 3, 2019. (Applicant cited references noted in this report in IDS filed Aug. 22, 2019 with the ISR).

Huang et al. "Controlled ring-opening polymerization of propylene oxide catalyzed by double metal-cyanide complex" dated Mar. 1, 2002, Journal of Polymer Science; Part A: Polymer Chemistry, 2002, vol. 40. pp. 1142-1150. [abstract provided].

(Continued)

*Primary Examiner* — Randy P Gulakowski
*Assistant Examiner* — Ha S Nguyen
(74) *Attorney, Agent, or Firm* — Shumaker, Loop & Kendrick, LLP

(57) ABSTRACT

The present invention relates to a method for preparing a high molecular weight polyether carbonate, by reacting an epoxide and carbon dioxide in the presence of a catalyst of formula (I), and a double metal cyanide (DMC) catalyst. The catalyst of formula (I) has the following structure:

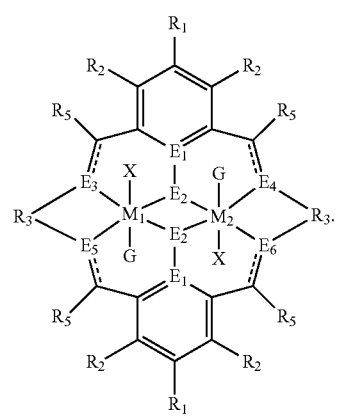

30 Claims, No Drawings

(56) References Cited

U.S. PATENT DOCUMENTS

| | | | |
|---|---|---|---|
| 7,968,754 | B2 | 6/2011 | Ostrowski et al. |
| 7,977,501 | B2 | 7/2011 | Haider et al. |
| 9,315,622 | B2 | 4/2016 | Hofmann et al. |
| 2003/0069389 | A1 | 4/2003 | Eleveld et al. |
| 2003/0158449 | A1 | 8/2003 | Hofmann et al. |
| 2004/0220430 | A1 | 11/2004 | Eleveld et al. |
| 2005/0065383 | A1 | 3/2005 | Wehmeyer |
| 2008/0167502 | A1 | 7/2008 | Bohres et al. |
| 2012/0232245 | A1* | 9/2012 | Jeong .............. C08G 65/2603 528/405 |
| 2013/0072602 | A1 | 2/2013 | Guertler et al. |
| 2014/0323670 | A1 | 10/2014 | Muller et al. |
| 2017/0204221 | A1* | 7/2017 | Keyworth ............ C08G 63/823 |

FOREIGN PATENT DOCUMENTS

| | | | |
|---|---|---|---|
| EP | 1568414 A | 8/2005 | |
| JP | 2014-508836 A | 4/2014 | |
| JP | 2014-526572 A | 10/2014 | |
| KR | 10-2000-0076100 | 12/2000 | |
| KR | 10-2012-0102183 | 9/2012 | |
| RU | 2191784 | 3/2018 | |
| WO | 9729146 | 8/1997 | |
| WO | 98/40162 A1 | 9/1998 | |
| WO | 2010028362 A1 | 3/2010 | |
| WO | 2012121508 A2 | 9/2012 | |
| WO | 2013034750 A2 | 3/2013 | |
| WO | 2015022290 A1 | 2/2015 | |
| WO | 2016012786 A1 | 1/2016 | |
| WO | WO-2016012786 A1 * | 1/2016 | .......... B01J 31/1835 |
| WO | 2017037441 A1 | 3/2017 | |

OTHER PUBLICATIONS

Varghese et al. "Double metal cyanide catalyst prepared using H3Co(CN)6 for high carbonate fraction and molecular weight control in carbon dioxide/propylene oxide copolymerization" Dated Aug. 26, 2013. Journal of Polymer Science; Part A: Polymer Chemistry, 2013, vol. 51. pages 4811-4818. [abstract provided].

International Search Report for International application No. PCT/EP2018/055046; dated Jun. 6, 2018; 3 pages.

Communication Pursuant to Article 94(3) EPC for European Patent Application No. 18708119.5, dated Oct. 2, 2020 (3 pages).

Saudi Arabian Office Action for SA Pat. Appln. No. 519402564 with English Translation dated Jul. 28, 2022 (3 pages).

Korean Office Action for KR App. 10-2019-7028222 dated Jul. 18, 2022 (28 pages).

Gao et al., "Dicarboxylic Acid Promoted Immortal Copolymerization for Controllable Synthesis of Low-Molecular Weight Oligo(carbonate-ether) Diols with Tunable Carbonate Unit Content", Journal of Polymer Science, Part A: Polymer Chemistry 2012, 50 5177-5184.

Encyclopedia of Polymer Science and Engineering vol. 11, 2nd Edition, 1988, p. 648-718.

Houben-Weyl, Methoden der organischen Chemie, vol. E20, Makromolekulare Stoffe, 4th Edition, 1987, p. 1443-1457.

"Ullmann's Encyclopaedia of Polymer Science and Engineering", vol. A21, 5th Edition, 1992, p. 207-215.

Kember et al., "Highly Active Dizinc Catalyst for the Co polymerization of Carbon Dioxide and Cyclohexene Oxide at One Atmosphere Pressure", Angew. Chem. Int. Ed. 2009, vol. 48, pp. 931-933.

Pinilla-de Dios et al., "Effect of Zn/Co initial preparation ratio in the activity of double metal cyanide catalysts for propylene oxide and CO2 copolymerization", European Polymer Journal, vol. 88, 2017, pp. 280-291.

* cited by examiner

METHOD FOR PREPARING POLYETHER CARBONATES

CROSS REFERENCE TO RELATED PATENT APPLICATIONS

This application claims the benefit of and priority to PCT/EP2018/055046 filed Mar. 1, 2018 which claims the benefit of and priority to European Application No. 1703324.2 filed on Mar. 1, 2017.

TECHNICAL FIELD AND BACKGROUND OF THE INVENTION

The present invention relates to a method for preparing a high molecular weight polyether carbonate, by reacting an epoxide and carbon dioxide in the presence of a catalyst of formula (I), and a double metal cyanide (DMC) catalyst.

It is known in the art that epoxides can be homopolymerised to form polyethers. Polyethers are polymers having —C—O—C— linkages in their backbones. Polyethylene oxide (PEO) and polypropylene oxide (PPO) are typical examples of polyethers.

Epoxides also undergo a copolymerisation reaction with carbon dioxide to form alternating aliphatic polycarbonates. Polycarbonates are polymers having —O—C(=O)O— linkages in their backbones. Polypropylene carbonate (PPC), polycyclohexene carbonate (PCHC) and polyethylene carbonate (PEC) are typical examples of aliphatic polycarbonates produced from epoxides and $CO_2$.

Polyethers are used in a variety of products, including elastomers, adhesives, sealants and epoxy flexibilisers. Polyethers are also used as hydraulic fluids and lubricants, as additives in cosmetics, and as binders in ceramic and metallic powders. Polyethers generally have very low glass transition temperatures ($T_g$—generally significantly below 0° C.) and so cannot be used as engineering plastics. Polyethers also typically have poor UV stability and are prone to oxidative degradation which results in strong discolouration.

Aliphatic polycarbonates such as PPC can be used as sacrificial binders and adhesives because they have a relatively low thermal stability and tend to degrade very cleanly. However, the low thermal stability of polycarbonates can reduce their usefulness in certain applications. For example, polycarbonates can be unstable under typical processing conditions required for the production of packaging materials. In general, aliphatic polycarbonates have better UV stability and better mechanical properties than polyethers. In addition, polycarbonates have higher glass transition temperatures ($T_g$'s) than polyethers. The polycarbonate PCHC has a high glass transition temperature (−110° C.) but has limited industrial use as a thermoplastic as it is very brittle.

Polyether carbonates have both ether and carbonate linkages in their backbones, and can be produced by the reaction of epoxides with $CO_2$ using catalysts that are able to catalyse both the homo- and co-polymerisation reactions. Polyether formation is generally more rapid than polycarbonate formation, and therefore catalysts that enable both reactions tend to form polyether carbonates which contain a majority of ether linkages, that is, polyether carbonates with <50% carbonate linkages. Forcing conditions (e.g. high pressures) are generally required to achieve carbonate linkages in the range of 50-100%.

The ability to tailor the amount of ether and carbonate linkages in the polymer backbone across the whole spectrum between polyethers and polycarbonates allows the physical and mechanical properties of the resulting polymer to be adjusted according to the desired end use. It is desirable to have both carbonate and ether linkages in the same polymer backbone, as blends of polyethers and polycarbonates may not be compatible. In addition, blends of polyethers and polycarbonates can separate. It is also desirable to form mixed ether and carbonate linkages in a random polymerisation rather than a block polymerisation, so as to gain truly intermediate properties.

As indicated above, polycarbonates can be brittle, particularly $CO_2$ based polycarbonates, and adding ether linkages can improve flexibility and elongation to break. On the other hand, carbonate linkages can add strength to polyethers, which can be soft. It is therefore desirable to be able to tailor a polyether carbonate product having a specific balance of flexibility and strength by controlling the relative amounts of ether and carbonate linkages.

The thermal stability of aliphatic polycarbonates can be increased by the addition of ether linkages, whilst the UV stability of polyethers can be increased by the addition of carbonate linkages. Aliphatic polycarbonates can be unstable to basic conditions, whilst polyethers are usually stable under such conditions. It is therefore desirable to be able to produce a polyether carbonate product having a specific degree of stability for a particular application.

Thus, it would be advantageous to provide a catalyst system to vary the amount of ether and carbonate linkages in order to tailor the properties of the resulting polymer accordingly and to produce a range of different products for different markets. It would also be advantageous for a catalyst system to be able to do this under mild conditions, e.g. under lower pressures (<20 bar).

A double metal cyanide (DMC) catalyst can be used to prepare polyethers by ring-opening polymerisation of epoxides. "DMC" catalyst is a term commonly used in documents and published patents to refer to catalysts having at least two metal centres and a cyanide ligand. Many patents related to methods for preparing the DMC catalyst and methods for preparing polyether using the DMC catalyst are disclosed [e.g. US 2008/0167502 (BASF); US 2003/0158449 (Bayer); US 2003/0069389 (Shell); US 2004/0220430 (Repsol Quimica); U.S. Pat. No. 5,536,883 (Arco); US 2005/0065383 (Dow), and U.S. Pat. No. 3,427,256 (The General Tyre and Rubber Company)].

DMC catalysts are also capable of preparing polyether carbonates. To prepare these types of polymers, the reaction is typically carried out at high pressures (such as 40 bar) of carbon dioxide. It is very difficult to incorporate more than 50% carbonate linkages into the backbone of a polyether carbonate using a DMC catalyst alone even at this pressure.

It has generally been found that, for DMC catalysts, in order to obtain more than 50% incorporation of carbon dioxide, the reaction must be carried out at pressures in excess of 40 bar. This can be undesirable as industrial equipment for preparing polyether carbonates is typically limited to pressures of up to 10 bar. For example, in US 2013/0072602, the examples set out the polymerisation of propylene oxide in the presence of a starter compound and an additive at 50 bar $CO_2$.

Many other catalysts for use in the preparation of polyether carbonates are known in the art. For example, WO 2012/121508 relates to a process for preparing polyether carbonates, which is ultimately intended for use as resins and soft plastics. The process disclosed in WO 2012/121508 requires the copolymerisation of an epoxide and carbon dioxide in the presence of a DMC catalyst and a metal salen catalyst having the following formula:

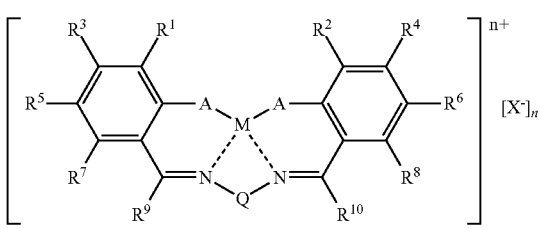

The examples are each carried out at 16 bar $CO_2$ or above. The resulting polyether carbonates contain varying amounts of ether and carbonate linkages, with 67% carbonate being the highest carbonate content achieved in WO 2012/121508, at a pressure of 28 bar. There are no examples in WO 2012/121508 of polyether carbonates having greater than 70% carbonate linkages in the polymer backbone.

Wang et al. (*J. Polymer. Sci., Part A: Polymer Chemistry*, 2012, 50, 362-370) describes a method for preparing high molecular weight polyether carbonates via the copolymerisation of an epoxide and carbon dioxide using a dual catalyst system in the presence of a starter compound. The dual catalyst system described in Wang comprises a DMC catalyst and a rare earth ternary (RET) catalyst. Polyether carbonates formed using the dual catalyst system of Wang at a pressure of 40 bar $CO_2$ have a molecular weight of around 100,000 Daltons and around 70-80% carbonate linkages in the polymer backbone.

In order to prepare high molecular weight polyethers or polyether carbonates using a DMC catalyst alone, it is generally necessary to use a starter compound in order to get the reaction to work. A starter (or initiator) compound is a compound that can react with a first substrate molecule to start (or initiate) a polymerisation reaction. For example, Wang (cited above) uses a starter compound to initiate the polymerisation reaction therein.

Even when a starter compound is present, it is difficult to prepare polyethers or polyether carbonates having an appreciable molecular weight (e.g. of 50,000 Daltons or more) using a DMC catalyst alone. For example, Varghese et al. reported that, in a reaction using a DMC catalyst, poly[PC-co-PO] diols could be prepared having a molecular weight up to about 46,000 Daltons (see *J. Polymer. Sci., Part A: Polymer Chemistry*, 2013, 51, 4811-4818). In addition, it is noted that Varghese et al. were only able to achieve up to about 60% carbonate linkages in the resulting polymers.

It is therefore desirable to be able to prepare polyether carbonates under pressures used in typical industrial equipment. It is also desirable to obtain appreciable incorporation of carbon dioxide (e.g. ≥20 wt % carbon dioxide, which requires a proportion of carbonate linkages of ~0.5 in the polymer backbone under low pressures).

It is also desirable to provide a method for the production of high molecular weight polyether carbonates. High molecular weight polymers (i.e. polymers with longer chain lengths) generally have better mechanical properties than their lower molecular weight counterparts. For example, high molecular weight polymers generally have improved abrasion resistance, chemical resistance, fracture toughness and frictional behaviour. As used herein, high molecular weight polymers are polymers that have a molecular weight of at least about 25,000 Daltons, such as at least about 40,000 Daltons, e.g. at least about 50,000 Daltons, or at least about 100,000 Daltons such as between about 50,000 Daltons and about 1,000,000 Daltons. High molecular weight polymers formed by the method of the present invention typically have molecular weights above about 50,000 Daltons. The term "molecular weight" refers to number average molecular weight unless otherwise indicated.

It has surprisingly been found that a combination of a catalyst of formula (I) and a DMC catalyst can be used to prepare high molecular weight polyether carbonates, without the need for a starter compound.

SUMMARY OF THE INVENTION

The invention relates to a method for preparing a polyether carbonate by reacting an epoxide and carbon dioxide in the presence of a catalyst of formula (I) and a double metal cyanide (DMC) catalyst. The present invention further relates to high molecular weight polyether carbonates produced by this method.

The catalyst of formula (I) is as follows:

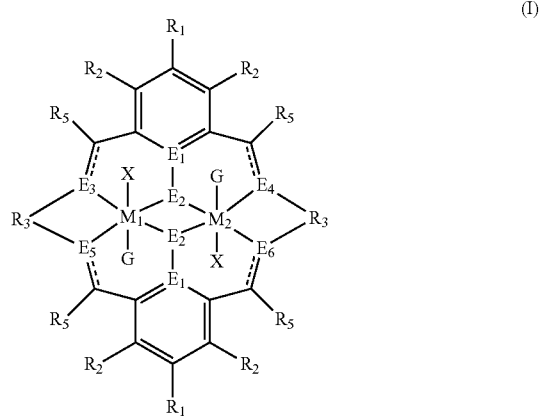

wherein:
$M_1$ and $M_2$ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)$_2$ or Ti(IV)-(X)$_2$;

$R_1$ and $R_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

$R_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

$R_5$ is independently selected from H, or optionally substituted aliphatic, heteroaliphatic, alicyclic, heteroalicyclic, aryl, heteroaryl, alkylheteroaryl or alkylaryl;

$E_1$ is C, $E_2$ is O, S or NH or $E_1$ is N and $E_2$ is O;

$E_3$, $E_4$, $E_5$ and $E_6$ are selected from N, NR$_4$, O and S, wherein when $E_3$, $E_4$, $E_5$ or $E_6$ are N, ====== is ═, and wherein when $E_3$, $E_4$, $E_5$ or $E_6$ are NR$_4$, O or S ------ is ─; R$_4$ is independently selected from H, or optionally substituted aliphatic, ====== heteroaliphatic, alicyclic, heteroalicyclic, aryl, heteroaryl, alkyl-heteroaryl, -alkylC(O)OR$_{19}$ or -alkylC≡N or alkylaryl;

X is independently selected from OC(O)R$^x$, OSO$_2$R$^x$, OSOR$^x$, OSO(R$^x$)$_2$, S(O)R$^x$, OR$^x$, phosphinate, halide, nitrate, hydroxyl, carbonate, amino, amido or optionally substituted aliphatic, heteroaliphatic, alicyclic, heteroalicyclic, aryl or heteroaryl, wherein each X may be the same or different and wherein X may form a bridge between M$_1$ and M$_2$;

R$_x$ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

The DMC catalyst comprises at least two metal centres and cyanide ligands. The DMC catalyst may additionally comprise at least one of: one or more complexing agents, water, a metal salt and/or an acid (e.g. in non-stoichiometric amounts).

For example, the DMC catalyst may comprise:

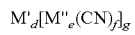

wherein M' is selected from Zn(II), Ru(II), Ru(III), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), M" is selected from Fe(II), Fe(III), Co(II), Co(III), Cr(II), Cr(III), Mn(II), Mn(III), Ir(III), Ni(II), Rh(III), Ru(II), V(IV), and V(V); and d, e, f and g are integers, and are chosen to such that the DMC catalyst has electroneutrality.

The method can be carried out at pressure of between about 1 bar and about 60 bar, between about 1 bar and about 30 bar, between about 1 bar and about 20 bar, between about 1 bar and about 15 bar, or between about 1 bar and about 10 bar carbon dioxide. It will also be appreciated that the reaction is capable of being carried out at a pressure of about 5 bar or below.

The method can be carried out at temperatures of from about 0° C. to about 250° C., for example from about 40° C. to about 140° C., e.g. from about 50° C. to about 110° C., such as from about 60° C. to about 100° C., for example, from about 70° C. to about 100° C., e.g. from about 55° C. to about 80° C.

The invention also provides a polymerisation system for the copolymerisation of carbon dioxide and an epoxide, comprising:
a. a catalyst of formula (I) as defined herein, and
b. a DMC catalyst as defined herein.

The invention is capable of preparing high molecular weight polyether carbonates which have n ether linkages and m carbonate linkages, wherein n and m are integers, and wherein m/(n+m) is from greater than zero to less than 1.

The high molecular weight polyether carbonates may be used as thermoplastic polymers in, for example, moulding and extrusion processes.

DETAILED DESCRIPTION OF THE INVENTION

For the purpose of the present invention, an aliphatic group is a hydrocarbon moiety that may be straight chain (i.e. unbranched) branched, or cyclic and may be completely saturated, or contain one or more units of unsaturation, but which is not aromatic. The term "unsaturated" means a moiety that has one or more double and/or triple bonds. The term "aliphatic" is therefore intended to encompass alkyl, cycloalkyl, alkenyl cycloalkenyl, alkynyl or cycloalkenyl groups, and combinations thereof.

An aliphatic group is preferably a $C_{1-30}$ aliphatic group, that is, an aliphatic group with 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 carbon atoms. Preferably, an aliphatic group is a $C_{1-15}$aliphatic, more preferably a $C_{1-12}$aliphatic, more preferably a $C_{1-10}$aliphatic, even more preferably a $C_{1-8}$aliphatic, such as a $C_{1-6}$aliphatic group. Suitable aliphatic groups include linear or branched, alkyl, alkenyl and alkynyl groups, and mixtures thereof such as (cycloalkyl)alkyl groups, (cycloalkenyl)alkyl groups and (cycloalkyl)alkenyl groups.

The term "alkyl," as used herein, refers to saturated, straight- or branched-chain hydrocarbon radicals derived by removal of a single hydrogen atom from an aliphatic moiety. An alkyl group is preferably a "$C_{1-20}$ alkyl group", that is an alkyl group that is a straight or branched chain with 1 to 20 carbons. The alkyl group therefore has 1, 2, 3, 4, 5, 6, 7, 8, 9, 10, 11, 12, 13, 14, 15, 16, 17, 18, 19 or 20 carbon atoms. Preferably, an alkyl group is a $C_{1-15}$alkyl, preferably a $C_{1-12}$ alkyl, more preferably a $C_{1-10}$ alkyl, even more preferably a $C_{1-8}$ alkyl, even more preferably a $C_{1-6}$ alkyl group. Specifically, examples of "$C_{1-20}$ alkyl group" include methyl group, ethyl group, n-propyl group, iso-propyl group, n-butyl group, iso-butyl group, sec-butyl group, tert-butyl group, sec-pentyl, iso-pentyl, n-pentyl group, neopentyl, n-hexyl group, sec-hexyl, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 1,1-dimethylpropyl group, 1,2-dimethylpropyl group, 2,2-dimethylpropyl group, 1-ethylpropyl group, n-hexyl group, 1-ethyl-2-methylpropyl group, 1,1,2-trimethylpropyl group, 1-ethylbutyl group, 1-methylbutyl group, 2-methylbutyl group, 1,1-dimethylbutyl group, 1,2-dimethylbutyl group, 2,2-dimethylbutyl group, 1,3-dimethylbutyl group, 2,3-dimethylbutyl group, 2-ethylbutyl group, 2-methylpentyl group, 3-methylpentyl group and the like.

The term "alkenyl," as used herein, denotes a group derived from the removal of a single hydrogen atom from a straight- or branched-chain aliphatic moiety having at least one carbon-carbon double bond. The term "alkynyl," as used herein, refers to a group derived from the removal of a single hydrogen atom from a straight- or branched-chain aliphatic moiety having at least one carbon-carbon triple bond. Alkenyl and alkynyl groups are preferably "$C_{2-20}$alkenyl" and "$C_{2-20}$alkynyl", more preferably "$C_{2-15}$ alkenyl" and "$C_{2-15}$ alkynyl", even more preferably "$C_{2-12}$ alkenyl" and "$C_{2-12}$ alkynyl", even more preferably "$C_{2-10}$alkenyl" and "$C_{2-10}$ alkynyl", even more preferably "$C_{2-8}$ alkenyl" and "$C_{2-8}$alkynyl", most preferably "$C_{2-6}$ alkenyl" and "$C_{2-6}$ alkynyl" groups, respectively. Examples of alkenyl groups include ethenyl, propenyl, allyl, 1,3-butadienyl, butenyl, 1-methyl-2-buten-1-yl, allyl, 1,3-butadienyl and allenyl. Examples of alkynyl groups include ethynyl, 2-propynyl (propargyl) and 1-propynyl.

The terms "cycloaliphatic", "carbocycle", or "carbocyclic" as used herein refer to a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Preferably, an alicyclic group has from 3 to 15, more preferably from 3 to 12, even more preferably from 3 to 10, even more preferably from 3 to 8 carbon atoms, even more preferably from 3 to 6 carbons atoms. The terms "cycloaliphatic", "carbocycle" or "carbocyclic" also include aliphatic rings that are fused to one or more aromatic or nonaromatic rings, such as tetrahydronaphthyl rings, where the point of attachment is on the aliphatic ring. A carbocyclic group may be polycyclic, e.g. bicyclic or tricyclic. It will be appreciated that the alicyclic group may comprise an alicyclic ring bearing one or more linking or non-linking alkyl substituents, such as —CH$_2$-cyclohexyl. Specifically, examples of carbocycles include cyclopropane, cyclobutane, cyclopentane, cyclohexane, bicycle[2,2,1]heptane, norborene, phenyl, cyclohexene, naphthalene, spiro[4.5]decane, cycloheptane, adamantane and cyclooctane.

A heteroaliphatic group (including heteroalkyl, heteroalkenyl and heteroalkynyl) is an aliphatic group as described above, which additionally contains one or more heteroatoms. Heteroaliphatic groups therefore preferably contain from 2 to 21 atoms, preferably from 2 to 16 atoms, more preferably from 2 to 13 atoms, more preferably from 2 to 11 atoms, more preferably from 2 to 9 atoms, even more preferably from 2 to 7 atoms, wherein at least one atom is a carbon atom. Particularly preferred heteroatoms are selected from O, S, N, P and Si. When heteroaliphatic groups have two or more heteroatoms, the heteroatoms may be the same or different. Heteroaliphatic groups may be substituted or unsubstituted, branched or unbranched, cyclic or acyclic, and include saturated, unsaturated or partially unsaturated groups.

An alicyclic group is a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Preferably, an alicyclic group has from 3 to 15, more preferably from 3 to 12, even more preferably from 3 to 10, even more preferably from 3 to 8 carbon atoms, even more preferably from 3 to 6 carbons atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substituents, such as —CH$_2$-cyclohexyl. Specifically, examples of the C$_{3-20}$ cycloalkyl group include cyclopropyl, cyclobutyl, cyclopentyl, cyclohexyl, cycloheptyl, adamantyl and cyclooctyl.

A heteroalicyclic group is an alicyclic group as defined above which has, in addition to carbon atoms, one or more ring heteroatoms, which are preferably selected from O, S, N, P and Si. Heteroalicyclic groups preferably contain from one to four heteroatoms, which may be the same or different. Heteroalicyclic groups preferably contain from 5 to 20 atoms, more preferably from 5 to 14 atoms, even more preferably from 5 to 12 atoms.

An aryl group or aryl ring is a monocyclic or polycyclic ring system having from 5 to 20 carbon atoms, wherein at least one ring in the system is aromatic and wherein each ring in the system contains three to twelve ring members. The term "aryl" can be used alone or as part of a larger moiety as in "aralkyl", "aralkoxy", or "aryloxyalkyl". An aryl group is preferably a "C$_{6-12}$ aryl group" and is an aryl group constituted by 6, 7, 8, 9, 10, 11 or 12 carbon atoms and includes condensed ring groups such as monocyclic ring group, or bicyclic ring group and the like. Specifically, examples of "C$_{6-10}$ aryl group" include phenyl group, biphenyl group, indenyl group, anthracyl group, naphthyl group or azulenyl group and the like. It should be noted that condensed rings such as indan, benzofuran, phthalimide, phenanthridine and tetrahydro naphthalene are also included in the aryl group.

The term "heteroaryl" used alone or as part of another term (such as "heteroaralkyl", or "heteroaralkoxy") refers to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of nitrogen. The term "heteroaryl" also includes groups in which a heteroaryl ring is fused to one or more aryl, cycloaliphatic, or heterocyclyl rings, where the radical or point of attachment is on the heteroaromatic ring. Examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. Thus, a heteroaryl group may be mono- or polycyclic.

The term "heteroaralkyl" refers to an alkyl group substituted by a heteroaryl, wherein the alkyl and heteroaryl portions independently are optionally substituted. As used herein, the terms "heterocycle", "heterocyclyl", "heterocyclic radical", and "heterocyclic ring" are used interchangeably and refer to a stable 5- to 7-membered monocyclic or 7-14-membered bicyclic heterocyclic moiety that is saturated, partially unsaturated, or aromatic and having, in addition to carbon atoms, one or more, preferably one to four, heteroatoms, as defined above. When used in reference to a ring atom of a heterocycle, the term "nitrogen" includes a substituted nitrogen.

Examples of alicyclic, heteroalicyclic, aryl and heteroaryl groups include but are not limited to cyclohexyl, phenyl, acridine, benzimidazole, benzofuran, benzothiophene, benzoxazole, benzothiazole, carbazole, cinnoline, dioxin, dioxane, dioxolane, dithiane, dithiazine, dithiazole, dithiolane, furan, imidazole, imidazoline, imidazolidine, indole, indoline, indolizine, indazole, isoindole, isoquinoline, isoxazole, isothiazole, morpholine, napthyridine, oxazole, oxadiazole, oxathiazole, oxathiazolidine, oxazine, oxadiazine, phenazine, phenothiazine, phenoxazine, phthalazine, piperazine, piperidine, pteridine, purine, pyran, pyrazine, pyrazole, pyrazoline, pyrazolidine, pyridazine, pyridine, pyrimidine, pyrrole, pyrrolidine, pyrroline, quinoline, quinoxaline, quinazoline, quinolizine, tetrahydrofuran, tetrazine, tetrazole, thiophene, thiadiazine, thiadiazole, thiatriazole, thiazine, thiazole, thiomorpholine, thianaphthalene, thiopyran, triazine, triazole, and trithiane.

The term "halide", "halo" and "halogen" are used interchangeably and, as used herein mean a fluorine atom, a chlorine atom, a bromine atom, an iodine atom and the like, preferably a fluorine atom, a bromine atom or a chlorine atom, and more preferably a fluorine atom.

A haloalkyl group is preferably a "C$_{1-20}$ haloalkyl group", more preferably a "C$_{1-15}$haloalkyl group", more preferably a "C$_{1-12}$ haloalkyl group", more preferably a "C$_{1-10}$ haloalkyl group", even more preferably a "C$_{1-8}$ haloalkyl group", even more preferably a "C$_{1-6}$ haloalkyl group" and is a C$_{1-20}$ alkyl, a C$_{1-15}$ alkyl, a C$_{1-12}$ alkyl, a C$_{1-10}$ alkyl, a C$_{1-8}$ alkyl, or a C$_{1-6}$ alkyl group, respectively, as described above substituted with at least one halogen atom, preferably 1, 2 or 3 halogen atom(s). The term "haloalkyl" encompasses fluorinated or chlorinated groups, including perfluorinated compounds. Specifically, examples of "C$_{1-20}$ haloalkyl group"

include fluoromethyl group, difluoromethyl group, trifluoromethyl group, fluoroethyl group, difluroethyl group, trifluoroethyl group, chloromethyl group, bromomethyl group, iodomethyl group and the like.

The term "acyl" as used herein refers to a group having a formula —C(O)R where R is hydrogen or an optionally substituted aliphatic, aryl, or heterocyclic group.

An alkoxy group is preferably a "$C_{1-20}$ alkoxy group", more preferably a "$C_{1-15}$ alkoxy group", more preferably a "$C_{1-12}$ alkoxy group", more preferably a "$C_{1-10}$ alkoxy group", even more preferably a "$C_{1-8}$ alkoxy group", even more preferably a "$C_{1-6}$ alkoxy group" and is an oxy group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively. Specifically, examples of "$C_{1-20}$ alkoxy group" include methoxy group, ethoxy group, n-propoxy group, iso-propoxy group, n-butoxy group, iso-butoxy group, sec-butoxy group, tert-butoxy group, n-pentyloxy group, iso-pentyloxy group, sec-pentyloxy group, n-hexyloxy group, iso-hexyloxy group, n-hexyloxy group, n-heptyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-octadecyloxy group, n-nonadecyloxy group, n-eicosyloxy group, 1,1-dimethylpropoxy group, 1,2-dimethylpropoxy group, 2,2-dimethylpropoxy group, 2-methylbutoxy group, 1-ethyl-2-methylpropoxy group, 1,1,2-trimethylpropoxy group, 1,1-dimethylbutoxy group, 1,2-dimethylbutoxy group, 2,2-dimethylbutoxy group, 2,3-dimethylbutoxy group, 1,3-dimethylbutoxy group, 2-ethylbutoxy group, 2-methylpentyloxy group, 3-methylpentyloxy group and the like.

An aryloxy group is preferably a "$C_{5-20}$ aryloxy group", more preferably a "$C_{6-12}$ aryloxy group", even more preferably a "$C_{6-10}$ aryloxy group" and is an oxy group that is bonded to the previously defined $C_{5-20}$ aryl, $C_{6-12}$ aryl, or $C_{6-10}$ aryl group respectively.

An alkylthio group is preferably a "$C_{1-20}$ alkylthio group", more preferably a "$C_{1-15}$ alkylthio group", more preferably a "$C_{1-12}$ alkylthio group", more preferably a "$C_{1-10}$ alkylthio group", even more preferably a "$C_{1-8}$ alkylthio group", even more preferably a "$C_{1-6}$ alkylthio group" and is a thio (—S—) group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively.

An arylthio group is preferably a "$C_{5-20}$ arylthio group", more preferably a "$C_{6-12}$ arylthio group", even more preferably a "$C_{6-10}$ arylthio group" and is a thio (—S—) group that is bonded to the previously defined $C_{5-20}$ aryl, $C_{6-12}$ aryl, or $C_{6-10}$ aryl group respectively.

An alkylaryl group is preferably a "$C_{6-12}$ aryl $C_{1-20}$ alkyl group", more preferably a preferably a "$C_{6-12}$ aryl $C_{1-16}$ alkyl group", even more preferably a "$C_{6-12}$ aryl $C_{1-6}$ alkyl group" and is an aryl group as defined above bonded at any position to an alkyl group as defined above. The point of attachment of the alkylaryl group to a molecule may be via the alkyl portion and thus, preferably, the alkylaryl group is —CH$_2$-Ph or —CH$_2$CH$_2$-Ph. An alkylaryl group can also be referred to as "aralkyl".

A silyl group is preferably a group —Si(R$_s$)$_3$, wherein each R$_s$ can be independently an aliphatic, heteroaliphatic, alicyclic, heteroalicyclic, aryl or heteroaryl group as defined above. In certain embodiments, each R$_s$ is independently an unsubstituted aliphatic, alicyclic or aryl. Preferably, each R$_s$ is an alkyl group selected from methyl, ethyl or propyl.

A silyl ether group is preferably a group OSi(R$_6$)$_3$ wherein each R$_6$ can be independently an aliphatic, heteroaliphatic, alicyclic, heteroalicyclic, aryl or heteroaryl group as defined above. In certain embodiments, each R$_6$ can be independently an unsubstituted aliphatic, alicyclic or aryl. Preferably, each R$_6$ is an optionally substituted phenyl or optionally substituted alkyl group selected from methyl, ethyl, propyl or butyl (such as n-butyl (nBu) or tert-butyl (tBu)). Exemplary silyl ether groups include OSi(Me)$_3$, OSi(Et)$_3$, OSi(Ph)$_3$, OSi(Me)$_2$(tBu), OSi(tBu)$_3$ and OSi(Ph)$_2$(tBu).

A nitrile group (also referred to as a cyano group) is a group CN.

An imine group is a group —CRNR, preferably a group —CHNR$_7$ wherein R$_7$ is an aliphatic, heteroaliphatic, alicyclic, heteroalicyclic, aryl or heteroaryl group as defined above. In certain embodiments, R$_7$ is unsubstituted aliphatic, alicyclic or aryl. Preferably R$_7$ is an alkyl group selected from methyl, ethyl or propyl.

An acetylide group contains a triple bond —C≡C—R$_9$, preferably wherein R$_9$ can be hydrogen, an aliphatic, heteroaliphatic, alicyclic, heteroalicyclic, aryl or heteroaryl group as defined above. For the purposes of the invention when R$_9$ is alkyl, the triple bond can be present at any position along the alkyl chain. In certain embodiments, R$_9$ is unsubstituted aliphatic, alicyclic or aryl. Preferably R$_9$ is methyl, ethyl, propyl or phenyl.

An amino group is preferably —NH$_2$, —NHR$_{10}$ or —N(R$_{10}$)$_2$ wherein R$_{10}$ can be an aliphatic, heteroaliphatic, alicyclic, heteroalicyclic, a silyl group, aryl or heteroaryl group as defined above. It will be appreciated that when the amino group is N(R$_{10}$)$_2$, each R$_{10}$ group can be the same or different. In certain embodiments, each R$_{10}$ is independently an unsubstituted aliphatic, alicyclic, silyl or aryl. Preferably R$_{10}$ is methyl, ethyl, propyl, SiMe$_3$ or phenyl.

An amido group is preferably —NR$_{11}$C(O)— or —C(O)—NR$_{11}$— wherein R$_{11}$ can be hydrogen, an aliphatic, heteroaliphatic, alicyclic, heteroalicyclic, aryl or heteroaryl group as defined above. In certain embodiments, R$_{11}$ is unsubstituted aliphatic, alicyclic or aryl. Preferably R$_{11}$ is hydrogen, methyl, ethyl, propyl or phenyl. The amido group may be terminated by hydrogen, an aliphatic, heteroaliphatic, alicyclic, heteroalicyclic, aryl or heteroaryl group.

An ester group is preferably —OC(O)R$_{12}$— or —C(O)OR$_{12}$— wherein R$_{12}$ can be an aliphatic, heteroaliphatic, alicyclic, heteroalicyclic, aryl or heteroaryl group as defined above. In certain embodiments, R$_{12}$ is unsubstituted aliphatic, alicyclic or aryl. Preferably R$_{12}$ is methyl, ethyl, propyl or phenyl. The ester group may be terminated by an aliphatic, heteroaliphatic, alicyclic, heteroalicyclic, aryl or heteroaryl group. It will be appreciated that if R$_{12}$ is hydrogen, then the group defined by —OC(O)R$_{12}$— or —C(O)OR$_{12}$— will be a carboxylic acid group.

A sulfoxide is preferably —S(O)R$_{13}$ and a sulfonyl group is preferably —S(O)$_2$R$_{13}$ wherein R$_{13}$ can be an aliphatic, heteroaliphatic, alicyclic, heteroalicyclic, aryl or heteroaryl group as defined above. In certain embodiments, R$_{13}$ is unsubstituted aliphatic, alicyclic or aryl. Preferably R$_{13}$ is methyl, ethyl, propyl or phenyl.

A carboxylate group is preferably —OC(O)R$_{14}$, wherein R$_{14}$ can be hydrogen, an aliphatic, heteroaliphatic, alicyclic, heteroalicyclic, aryl or heteroaryl group as defined above. In certain embodiments, R$_{14}$ is unsubstituted aliphatic, alicyclic or aryl. Preferably R$_{14}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

An acetamide is preferably MeC(O)N($R_{15}$)$_2$ wherein $R_{15}$ can be hydrogen, an aliphatic, heteroaliphatic, alicyclic, heteroalicyclic, aryl or heteroaryl group as defined above. In certain embodiments, $R_{15}$ is unsubstituted aliphatic, alicyclic or aryl. Preferably $R_{15}$ is hydrogen, methyl, ethyl, propyl or phenyl.

A phosphinate group is preferably a group —OP(O)($R_{16}$)$_2$ or —P(O)(O$R_{16}$)($R_{16}$) wherein each $R_{16}$ is independently selected from hydrogen, or an aliphatic, heteroaliphatic, alicyclic, heteroalicyclic, aryl or heteroaryl group as defined above. In certain embodiments, $R_{16}$ is aliphatic, alicyclic or aryl, which are optionally substituted by aliphatic, alicyclic, aryl or $C_{1-6}$alkoxy. Preferably $R_{16}$ is optionally substituted aryl or $C_{1-20}$ alkyl, more preferably phenyl optionally substituted by $C_{1-6}$alkoxy (preferably methoxy) or unsubstituted $C_{1-20}$ alkyl (such as hexyl, octyl, decyl, dodecyl, tetradecyl, hexadecyl, stearyl). A phosphonate group is preferably a group —P(O)(O$R_{16}$)$_2$ wherein $R_{16}$ is as defined above. It will be appreciated that when either or both of $R_{16}$ is hydrogen for the group —P(O)(O$R_{16}$)$_2$, then the group defined by —P(O)(O$R_{16}$)$_2$ will be a phosphonic acid group.

A sulfinate group is preferably —S(O)O$R_{17}$ or —OS(O)$R_{17}$ wherein $R_{17}$ can be hydrogen, an aliphatic, heteroaliphatic, haloaliphatic, alicyclic, heteroalicyclic, aryl or heteroaryl group as defined above. In certain embodiments, $R_{17}$ is unsubstituted aliphatic, alicyclic or aryl. Preferably $R_{17}$ is hydrogen, methyl, ethyl, propyl or phenyl. It will be appreciated that if $R_{17}$ is hydrogen, then the group defined by —S(O)O$R_{17}$ will be a sulfonic acid group.

A carbonate group is preferably —OC(O)O$R_{18}$, wherein $R_{18}$ can be hydrogen, an aliphatic, heteroaliphatic, alicyclic, heteroalicyclic, aryl or heteroaryl group as defined above. In certain embodiments, $R_{18}$ is optionally substituted aliphatic, alicyclic or aryl. Preferably $R_{18}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl, cyclohexyl, benzyl or adamantyl. It will be appreciated that if $R_{17}$ is hydrogen, then the group defined by —OC(O)O$R_{18}$ will be a carbonic acid group.

In an -alkylC(O)O$R_{19}$ or -alkylC(O)$R_{19}$ group, $R_{19}$ can be hydrogen, an aliphatic, heteroaliphatic, alicyclic, heteroalicyclic, aryl or heteroaryl group as defined above. In certain embodiments, $R_{19}$ is unsubstituted aliphatic, alicyclic or aryl. Preferably $R_{19}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

It will be appreciated that where any of the above groups are present in a Lewis base G, one or more additional R groups may be present, as appropriate, to complete the valency. For example, in the context of an amino group, an additional R group may be present to give RNH$R_{10}$, wherein R is hydrogen, an optionally substituted aliphatic, heteroaliphatic, alicyclic, heteroalicyclic, aryl or heteroaryl group as defined above. Preferably, R is hydrogen or aliphatic, alicyclic or aryl.

As used herein, the term "optionally substituted" means that one or more of the hydrogen atoms in the optionally substituted moiety is replaced by a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable compounds. The term "stable", as used herein, refers to compounds that are chemically feasible and can exist for long enough at room temperature i.e. (16-25° C.) to allow for their detection, isolation and/or use in chemical synthesis.

Preferred optional substituents for use in the present invention include, but are not limited to, halogen, hydroxy, nitro, carboxylate, carbonate, alkoxy, aryloxy, alkylthio, arylthio, heteroaryloxy, alkylaryl, amino, amido, imine, nitrile, silyl, silyl ether, ester, sulfoxide, sulfonyl, acetylide, phosphinate, sulfonate or optionally substituted aliphatic, heteroaliphatic, alicyclic, heteroalicyclic, aryl or heteroaryl groups (for example, optionally substituted by halogen, hydroxy, nitro, carbonate, alkoxy, aryloxy, alkylthio, arylthio, amino, imine, nitrile, silyl, sulfoxide, sulfonyl, phosphinate, sulfonate or acetylide). It will be appreciated that although in formula (I), the groups X and G are illustrated as being associated with a single $M_1$ or $M_2$ metal centre, one or more X and G groups may form a bridge between the $M_1$ and $M_2$ metal centres.

For the purposes of the present invention, the epoxide substrate is not limited. The term epoxide therefore relates to any compound comprising an epoxide moiety (i.e. a substituted or unsubstituted oxirane compound). Substituted oxiranes include monosubstituted oxiranes, disubstituted oxiranes, trisubstituted oxiranes, and tetrasubstituted oxiranes. In certain embodiments, epoxides comprise a single oxirane moiety. In certain embodiments, epoxides comprise two or more oxirane moieties.

Examples of epoxides which may be used in the present invention include, but are not limited to, cyclohexene oxide, styrene oxide, ethylene oxide, propylene oxide, butylene oxide, substituted cyclohexene oxides (such as limonene oxide, $C_{10}H_{16}O$ or 2-(3,4-epoxycyclohexyl)ethyltrimethoxysilane, $C_{11}H_{22}O$), alkylene oxides (such as ethylene oxide and substituted ethylene oxides), unsubstituted or substituted oxiranes (such as oxirane, epichlorohydrin, 2-(2-methoxyethoxy)methyl oxirane (MEMO), 2-(2-(2-methoxyethoxy)ethoxy)methyl oxirane (ME2MO), 2-(2-(2-(2-methoxyethoxy)ethoxy)ethoxy)methyl oxirane (ME3MO), 1,2-epoxybutane, glycidyl ethers, vinyl-cyclohexene oxide, 3-phenyl-1,2-epoxypropane, 1,2- and 2,3-epoxybutane, isobutylene oxide, cyclopentene oxide, 2,3-epoxy-1,2,3,4-tetrahydronaphthalene, indene oxide, and functionalized 3,5-dioxaepoxides. Examples of functionalized 3,5-dioxaepoxides include:

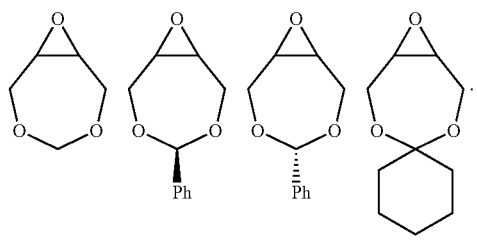

The epoxide moiety may be a glycidyl ether, glycidyl ester or glycidyl carbonate. Examples of glycidyl ethers, glycidyl esters glycidyl carbonates include:

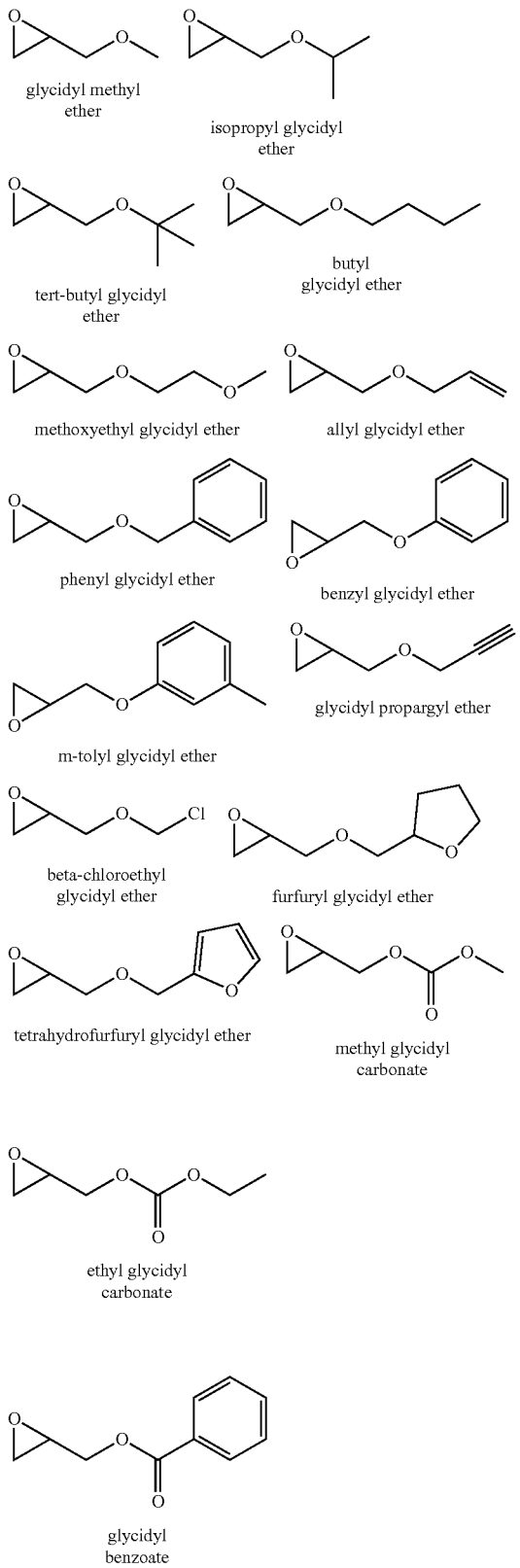

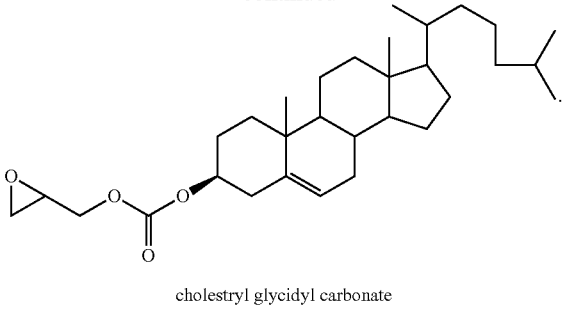

cholestryl glycidyl carbonate

As noted above, the epoxide substrate may contain more than one epoxide moiety, i.e. it may be a bis-epoxide, a tris-epoxide, or a multi-epoxide containing moiety. Examples of compounds including more than one epoxide moiety include bisphenol A diglycidyl ether and 3,4-epoxy-cyclohexylmethyl 3,4-epoxycyclohexanecarboxylate. It will be understood that reactions carried out in the presence of one or more compounds having more than one epoxide moiety may lead to cross-linking in the resulting polymer.

The skilled person will appreciate that the epoxide can be obtained from "green" or renewable resources. The epoxide may be obtained from a (poly)unsaturated compound, such as those deriving from a fatty acid and/or terpene, obtained using standard oxidation chemistries.

The epoxide moiety may contain —OH moieties, or protected —OH moieties. The —OH moieties may be protected by any suitable protecting group. Suitable protecting groups include methyl or other alkyl groups, benzyl, allyl, tert-butyl, tetrahydropyranyl (THP), methoxymethyl (MOM), acetyl (C(O)alkyl), benzolyl (C(O)Ph), dimethoxytrityl (DMT), methoxyethoxymethyl (MEM), p-methoxybenzyl (PMB), trityl, silyl (such as trimethylsilyl (TMS), t-butyldimethylsilyl (TBDMS, t-butyldiphenylsilyl (TBDPS), tri-iso-propylsilyloxymethyl (TOM), and triisopropylsilyl (TIPS)), (4-methoxyphenyl)diphenylmethyl (MMT), tetrahydrofuranyl (THF), and tetrahydropyranyl (THP).

The epoxide preferably has a purity of at least 98%, more preferably >99%.

It will be understood that the term "an epoxide" is intended to encompass one or more epoxides. In other words, the term "an epoxide" refers to a single epoxide, or a mixture of two or more different epoxides. For example, the epoxide substrate may be a mixture of ethylene oxide and propylene oxide, a mixture of cyclohexene oxide and propylene oxide, a mixture of ethylene oxide and cyclohexene oxide, or a mixture of ethylene oxide, propylene oxide and cyclohexene oxide.

The present invention provides a method for preparing a polyether carbonate by reacting an epoxide with carbon dioxide in the presence of a catalyst of formula (I), and a double metal cyanide (DMC) catalyst, and high molecular weight polyether carbonates produced by this method.

Catalysts of Formula (I)
The catalyst of formula (I) has the following structure:

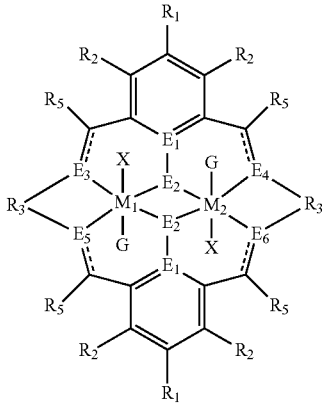 (I)

wherein:
M₁ and M₂ are independently selected from Zn(II), Cr(II), Co(II), Cu(II), Mn(II), Mg(II), Ni(II), Fe(II), Ti(II), V(II), Cr(III)-X, Co(III)-X, Mn(III)-X, Ni(III)-X, Fe(III)-X, Ca(II), Ge(II), Al(III)-X, Ti(III)-X, V(III)-X, Ge(IV)-(X)₂ or Ti(IV)-(X)₂;

R₁ and R₂ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

R₃ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

R₅ is independently selected from H, or optionally substituted aliphatic, heteroaliphatic, alicyclic, heteroalicyclic, aryl, heteroaryl, alkylheteroaryl or alkylaryl;

E₁ is C, E₂ is O, S or NH or E₁ is N and E₂ is O;

E₃, E₄, E₅ and E₆ are selected from N, NR₄, O and S, wherein when E₃, E₄, E₅ or E₆ are N, ------ is ═, and wherein when E₃, E₄, E₅ or E₆ are NR₄, O or S, ------ is —; R₄ is independently selected from H, or optionally substituted aliphatic, ------ heteroaliphatic, alicyclic, heteroalicyclic, aryl, heteroaryl, alkylheteroaryl, -alkylC(O)OR₁₉ or -alkylC≡N or alkylaryl;

X is independently selected from OC(O)Rˣ, OSO₂Rˣ, OSO(Rˣ)₂, S(O)Rˣ, ORˣ, phosphinate, halide, nitrate, hydroxyl, carbonate, amino, amido or optionally substituted aliphatic, heteroaliphatic, alicyclic, heteroalicyclic, aryl or heteroaryl, wherein each X may be the same or different and wherein X may form a bridge between M₁ and M₂;

Rₓ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

Each of the occurrences of the groups R₁ and R₂ may be the same or different, and R₁ and R₂ can be the same or different.

Preferably R₁ and R₂ are independently selected from hydrogen, halide, amino, nitro, sulfoxide, sulfonyl, sulfinate, and an optionally substituted alkyl, alkenyl, aryl, heteroaryl, silyl, silyl ether, alkoxy, aryloxy or alkylthio. Preferably each occurrence of R₂ is the same. Preferably, each occurrence of R₂ is the same, and is hydrogen.

Both occurrences of R₁ may be the same, and may be selected from hydrogen, halide, amino, nitro, sulfoxide, sulfonyl, sulfinate, silyl, silyl ether and an optionally substituted alkyl, alkenyl, aryl, heteroaryl, alkoxy, aryloxy or alkylthio. For example, both occurrences of R₁ may be the same, and may be selected from hydrogen, halide, sulfoxide, and an optionally substituted alkyl, heteroaryl, silyl, alkylthio or alkoxy. Exemplary options for R₁ (which may both be the same) include hydrogen, methyl, t-butyl, methoxy, ethoxy, alkylthio, trialkylsilyl such as trimethylsilyl or triethylsilyl, bromide, methanesulfonyl, or piperidinyl, e.g. both occurrences of R₁ may be the same, and may be selected from methyl, t-butyl or trialkylsilyl.

Preferably, each occurrence of R₂ is hydrogen and each R₁ is independently selected from hydrogen, halide, amino, nitro, sulfoxide, sulfonyl, sulfinate, and optionally substituted alkyl, alkenyl, aryl, heteroaryl, silyl, silyl ether, alkoxy, aryloxy, alkylthio, arylthio, such as hydrogen, $C_{1-6}$ alkyl (e.g. haloalkyl), alkoxy, aryl, halide, nitro, sulfonyl, silyl and alkylthio, for example, tBu, iPr, Me, OMe, H, nitro, $SO_2Me$, $SiEt_3$, $SiMe_3$, SMe, halogen or phenyl.

It will be understood that each occurrence of $R^1$ may be the same, and each occurrence of R₂ may be the same, and R₁ may be different to R₂.

It will be appreciated that the group R₃ can be a disubstituted divalent alkyl, alkenyl, alkynyl, heteroalkyl, heteroalkenyl or heteroalkynyl group which may optionally be interrupted by an aryl, heteroaryl, alicyclic or heteroalicyclic group, or may be a disubstituted aryl or cycloalkyl group which acts as a bridging group between two nitrogen centres in the catalyst of formula (I). Thus, where R₃ is an alkylene group, such as dimethylpropylenyl, the R₃ group has the structure —CH₂—C(CH₃)₂—CH₂—. The definitions of the alkyl, aryl, cycloalkyl etc. groups set out above therefore also relate respectively to the divalent alkylene, arylene, cycloalkylene etc. groups set out for R₃, and may be optionally substituted. Exemplary options for R₃ include ethylenyl, 2,2-fluoropropylenyl, 2,2-dimethylpropylenyl, propylenyl, butylenyl, phenylenyl, cyclohexylenyl or biphenylenyl. When R₃ is cyclohexylenyl, it can be the racemic, RR- or SS-forms.

R₃ can be independently selected from substituted or unsubstituted alkylene and substituted or unsubstituted arylene, preferably substituted or unsubstituted propylenyl, such as propylenyl and 2,2-dimethylpropylenyl, and substituted or unsubstituted phenylenyl or biphenylenyl. Preferably both occurrences of R₃ are the same. Even more preferably R₃ is a substituted propylenyl, such as 2,2-di(alkyl)propylenyl, especially 2,2-di(methyl)propylenyl.

R₃ can be independently selected from substituted or unsubstituted alkylene, alkenylene, alkynylene, heteroalkylene, heteroalkenylene or heteroalkynylene, arylene or cycloalkylene. Preferably, R₃ is selected from substituted or unsubstituted alkylene, cycloalkylene, alkenylene, heteroalkylene and arylene. More preferably, R₃ is selected from 2,2-dimethylpropylenyl, —CH₂CH₂CH₂—, —CH₂CH(CH₃)CH₂—, —CH₂C(CH₂C₆H₅)₂CH₂—, phenylene, —CH₂CH₂—, —CH₂CH₂CH₂CH₂—, —CH₂CH₂N(CH₃)

$CH_2CH_2$—, 1,4-cyclohexandiyl or —$CH_2CH_2CH(C_2H_5)$—. Still more preferably $R_3$ is selected from 2,2-dimethylpropylenyl, —$CH_2CH_2CH_2$, —$CH_2CH(CH_3)CH_2$—, —$CH_2C(CH_2C_6H_5)_2CH_2$—, —$CH_2CH_2CH$($C_2H_5$)—, —$CH_2CH_2CH_2CH_2$—. More preferably still, $R_3$ is selected from 2,2-dimethylpropylenyl, —$CH_2C(CH_2C_6H_5)_2CH_2$—, $CH_2CH(CH_3)CH_2$ and —$CH_2 C(C_2H_5)_2 CH_2$—.

Most preferably $R_3$ is a substituted propylenyl, such as 2,2-di(alkyl)propylenyl, more preferably 2,2-dimethylpropylenyl.

As set out above, $E_3$, $E_4$, $E_5$ and $E_6$ are each independently selected from N, $NR_4$, O and S. The skilled person will understand that if any of $E_3$, $E_4$, $E_5$ or $E_6$ are N, ====== is =, and if any of $E_3$, $E_4$, $E_5$ or $E_6$ are $NR_4$, O or S, ====== is —. Preferably, $E_3$, $E_4$, $E_5$ and $E_6$ are each independently selected from $NR_4$, O and S.

Preferably each $R_4$ is independently selected from hydrogen, and an optionally substituted alkyl, alkenyl, alkynyl, aryl, heteroalkyl, heteroalkenyl, heteroalkynyl, heteroaryl, -alkylC(O)$OR_{19}$ or -alkylC≡N. Each $R_4$ may be the same or different. Preferably, $R_4$ is selected from hydrogen, and an optionally substituted alkyl, alkenyl, alkynyl, aryl, heteroalkyl, heteroalkenyl, heteroalkynyl or heteroaryl. Exemplary options for $R_4$ include H, Me, Et, Bn, iPr, tBu or Ph, and —$CH_2$-(pyridine). Preferably each $R_4$ is hydrogen or alkyl.

Preferably each $R_5$ is independently selected from hydrogen, and optionally substituted aliphatic or aryl. More preferably, each $R_5$ is independently selected from hydrogen, and optionally substituted alkyl or aryl. Even more preferably, each $R_5$ is the same, and is selected from hydrogen, and optionally substituted alkyl or aryl. Exemplary $R_5$ groups include hydrogen, methyl, ethyl, phenyl and trifluoromethyl, preferably hydrogen, methyl or trifluoromethyl. Even more preferably, each $R_5$ is hydrogen.

Preferably both occurrences of $E_1$ are C and both occurrences of $E_2$ are the same, and selected from O, S or NH. Even more preferably, both occurrences of $E_1$ are C and both occurrences of $E_2$ are O.

The skilled person will appreciate that the macrocyclic ligand of the catalyst of formula (I) may be symmetric, or may be asymmetric.

When the macrocyclic ligand is symmetric, it will be appreciated that each occurrence of $E_3$, $E_4$, $E_5$ and $E_6$ will be the same. For example, each occurrence of $E_3$, $E_4$, $E_5$ and $E_6$ may be $NR_4$ (and each $R_4$ may be the same). It will be understood that $E_3$, $E_4$, $E_5$ and $E_6$ may be the same and may be NH. In other words, the catalyst of formula (I) may have the following structure:

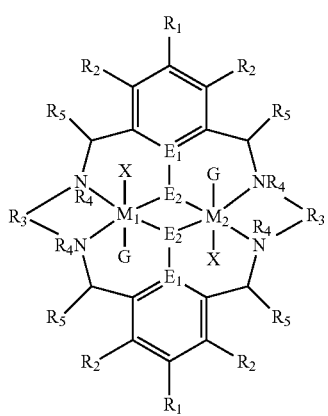

(II)

When the macrocyclic ligand is symmetric, it will be appreciated that each occurrence of $R_1$ may be the same, each occurrence of $R_2$ may be the same, each occurrence of $R_3$ may be the same, each occurrence of $R_5$ may be the same, each occurrence of $E_1$ may be the same, and each occurrence of $E_2$ may be the same (although $R_1$, $R_2$, $R_3$ and $R_5$ are not necessarily the same as each other), and $E_3$, $E_4$, $E_5$ and $E_6$ are the same.

For example, each occurrence of $R_2$, and $R_5$ may be hydrogen, each occurrence of $E_3$, $E_4$, $E_5$ and $E_6$ are $NR_4$, and each $R_4$ is hydrogen or alkyl, each occurrence of $R_3$ may be substituted or unsubstituted alkylene, cycloalkylene, alkenylene, heteroalkylene and arylene, each occurrence of $R^1$ may be selected from hydrogen, halogen, sulfoxide or substituted or unsubstituted alkyl, heteroaryl, silyl, alkylthio or alkoxy, both occurrences of $E_1$ may be C and both occurrences of $E_2$ may be O.

When the ligand of the catalyst of formula (I) is asymmetric, it will be appreciated that at least one of the occurrences of the groups $R_1$, $R_2$, $R_3$, $R_4$, $R_5$, $E_1$ or $E_2$ may be different from the remaining occurrences of the same group, or at least one occurrence of $E_3$, $E_4$, $E_5$ and $E_6$ is different to a remaining occurrence of $E_3$, $E_4$, $E_5$ and $E_6$. For example each occurrence of $R_3$ may be different, or each occurrence of $R_1$ may be different.

It will also be appreciated that $E_3$ and $E_5$ may be the same, and $E_4$ and $E_6$ may be the same, but $E_3$ and $E_5$ are different to $E_4$ and $E_6$. It will also be appreciated that $E_3$ and $E_4$ may be the same, and $E_5$ and $E_6$ may be the same, but $E_3$ and $E_4$ are different to $E_5$ and $E_6$. Alternatively one occurrence of $E_3$, $E_4$, $E_5$ and $E_6$ is different to the remaining occurrences of $E_3$, $E_4$, $E_5$ and $E_6$ (and the remaining three occurrences are the same). For example, $E_3$, $E_4$ and $E_5$ may be —$NR_4$ where $R_4$ is H, and $R_6$ may be $NR_4$ where $R_4$ is alkyl. Furthermore, $E_3$ and $E_5$ may be $NR_4$ where $R_4$ is H, and $E_4$ and $E_e$ may be $NR_4$ where $R_4$ is alkyl, or $E_3$ and $E_4$ may be $NR_4$ where $R_4$ is H, and $E_5$ and $E_6$ may be $NR_4$ where $R_4$ is alkyl. Thus, it will be appreciated that each $E_3$, $E_4$, $E_5$ and $E_6$ is preferably $NR_4$, where at least one occurrence of $R_4$ is different to the remaining occurrences of $R_4$.

For the catalysts of formula (I), (symmetric and asymmetric), each X is independently selected from OC(O)$R^x$, $OSO_2R^x$, OS(O)$R^x$, OSO($R^x$)$_2$, S(O)$R^x$, $OR^x$, phosphinate, halide, nitro, hydroxyl, carbonate, amino, nitrate, amido and optionally substituted, aliphatic, heteroaliphatic (for example silyl), alicyclic, heteroalicyclic, aryl or heteroaryl. Preferably each X is independently OC(O)$R^x$, $OSO_2R^x$, OS(O)$R^x$, OSO($R^x$)$_2$, S(O)$R^x$, $OR^x$, halide, nitrate, hydroxyl, carbonate, amino, nitro, amido, alkyl (e.g. branched alkyl), heteroalkyl, (for example silyl), aryl or heteroaryl. Even more preferably, each X is independently OC(O)$R^x$, $OR^x$, halide, carbonate, amino, nitro, alkyl, aryl, heteroaryl, phosphinate or $OSO_2R^x$. Preferred optional substituents for when X is aliphatic, heteroaliphatic, alicyclic, heteroalicyclic, aryl or heteroaryl include halogen, hydroxyl, nitro, cyano, amino, or substituted or unsubstituted aliphatic, heteroaliphatic, alicyclic, heteroalicyclic, aryl or heteroaryl. Each X may be the same or different and preferably each X is the same. It will also be appreciated that X may form a bridge between the two metal centres.

$R^x$ is independently hydrogen, or optionally substituted aliphatic, haloaliphatic, heteroaliphatic, alicyclic, heteroalicyclic, aryl, alkylaryl, or heteroaryl. Preferably, $R^x$ is alkyl, alkenyl, alkynyl, heteroalkyl, aryl, heteroaryl, cycloalkyl, or alkylaryl. Preferred optional substituents for $R^x$ include halogen, hydroxyl, cyano, nitro, amino, alkoxy, alkylthio, or substituted or unsubstituted aliphatic, heteroaliphatic, alicyclic, heteroalicyclic, aryl or heteroaryl (e.g. optionally substituted alkyl, aryl, or heteroaryl).

Exemplary options for X include OAc, OC(O)CF$_3$, halogen, OSO(CH$_3$)$_2$, Et, Me, OMe, OiPr, OtBu, Cl, Br, I, F, N(iPr)$_2$ or N(SiMe$_3$)$_2$ OPh, OBn, salicylate, dioctyl phosphinate, etc.

Preferably each X is the same, and is selected from OC(O)R$^x$, OR$^x$, halide, carbonate, amino, nitro, alkyl, aryl, heteroaryl, phosphinate or OSO$_2$R$^x$, R$^x$ is alkyl, alkenyl, alkynyl, heteroalkyl, aryl, heteroaryl or alkylaryl. More preferably each X is the same and is OC(O)R$^x$, OR$^x$, halide, alkyl, aryl, heteroaryl, phosphinate or OSO$_2$R$^x$. Still more preferably each X is the same and is OC(O)R$^x$. More preferably still each X is the same and is selected from OAc, O$_2$CCF$_3$, or O$_2$C(CH$_2$)$_3$Cy. Most preferably each X is the same and is OAc.

Preferably each R$^x$ is the same and is selected from an optionally substituted alkyl, alkenyl, alkynyl, heteroalkyl, aryl, heteroaryl, cycloalkyl or alkylaryl. More preferably each R$^x$ is the same and is an optionally substituted alkyl, alkenyl, heteroalkyl, aryl, heteroaryl, cycloalkyl or alkylaryl. Still more preferably each R$^x$ is the same and is an optionally substituted alkyl, alkenyl, heteroalkyl; or cycloalkyl. More preferably still R$^x$ is an optionally substituted alkyl, heteroalkyl or cycloalkyl. Most preferably R$^x$ is an optionally substituted alkyl.

It will be appreciated that preferred definitions for X and preferred definitions for R$^x$ may be combined. For example, each X may be independently OC(O)R$^x$, OSO$_2$R$^x$, OS(O)R$^x$, OSO(R$^x$)$_2$, S(O)R$^x$, OR$^x$, halide, nitrate, hydroxyl, carbonate, amino, nitro, amido, alkyl (e.g. branched alkyl), heteroalkyl, (for example silyl), aryl or heteroaryl, e.g. each may be independently OC(O)R$^x$, OR$^x$, halide, carbonate, amino, nitro, alkyl, aryl, heteroaryl, phosphinate or OSO$_2$R$^x$, and R$^x$ may be optionally substituted alkyl, alkenyl, alkynyl, heteroalkyl, aryl, heteroaryl, cycloalkyl, or alkylaryl.

As detailed above, M$_1$ and M$_2$ are independently selected from any of: Zn(II), Cr(III)-X, Cr(II), Co(III)-X, Co(II), Cu(II), Mn(III)-X, Mn(II), Mg(II), Ni(II), Ni(III)-X, Fe(II), Fe(III)-X, Ca(II), Ge(II), Ti(II), Al(III)-X, Ti(III)-X, V(II), V(III)-X, Ge(IV)-(X) or Ti(IV)-(X)$_2$.

Preferably, at least one of M$_1$ and M$_2$ is selected from Zn(II), Cr(III)-X, Co(II), Mn(II), Mg(II), Ni(II), Fe(II), and Fe(III)-X, more preferably at least one of M$_1$ and M$_2$ is selected from Mg(II), Zn(II), and Ni(II), for example, at least one of M$_1$ and M$_2$ is Ni(II).

It will be appreciated that M$_1$ and M$_2$ may be the same or different. For example, M$_1$ and/or M$_2$ may be selected from Zn(II), Cr(III)-X, Co(II), Mn(II), Mg(II), Ni(II), Fe(II), and Fe(III)-X, more preferably M$_1$ and/or M$_2$ is selected from Mg(II), Zn(II) and Ni(II), for example, M$_1$ and/or M$_2$ is Ni(II).

Exemplary combinations of M$_1$ and M$_2$ include Mg(II) and Mg(II), Zn(II) and Zn(II), Ni(II) and Ni(II), Mg(II) and Zn(II), Mg(II) and Ni(II), Zn(II) and Co(II), Co(II) and Co(III), Fe(III) and Fe(III), Zn(II) and Fe(II), or Zn(II) and Ni(II).

It will be appreciated that when one of M$_1$ or M$_2$ is Cr(III), Co(III), Mn(III), Ni(III), Fe(III), Al(III), Ti(III) or V(III) the catalyst of formula (I) will contain an additional X group co-ordinated to the metal centre, wherein X is as defined above. It will also be appreciated that when one of M$_1$ or M$_2$ is Ge(IV) or Ti(IV), the catalyst of formula (III) will contain two additional X group co-ordinated to the metal centre, wherein X is as defined above. In certain embodiments, when one of M$_1$ or M$_2$ is Ge(IV)-(X)$_2$ or Ti(IV)-(X)$_2$, both G may be absent.

When G is not absent, it is a group which is capable of donating a lone pair of electrons (i.e. a Lewis base). In certain embodiments, G is a nitrogen-containing Lewis base. Each G may be neutral or negatively charged. If G is negatively charged, then one or more positive counterions will be required to balance out the charge of the complex. Suitable positive counterions include group 1 metal ions (N$^+$, K$^+$, etc.), group 2 metal ions (Mg$^{2+}$, Ca$^{2+}$, etc.), imidazolium ions, a positively charged optionally substituted heteroaryl, heteroaliphatic or heteroalicyclic group, ammonium ions (i.e. N(R$^{12}$)$_4$$^+$), iminium ions (i.e. (R$^{12}$)$_2$C=N(R$^{12}$)$_2$$^+$, such as bis(triphenylphosphine)iminium ions) or phosphonium ions (P(R$^{12}$)$_4$$^+$), wherein each R$^{12}$ is independently selected from hydrogen or optionally substituted aliphatic, heteroaliphatic, alicyclic, heteroalicyclic, aryl or heteroaryl. Exemplary counterions include [H-B]$^+$ wherein B is selected from triethylamine, 1,8-diazabicyclo[5.4.0]undec-7-ene and 7-methyl-1,5,7-triazabicyclo[4.4.0]dec-5-ene.

G is preferably independently selected from an optionally substituted heteroaliphatic group, an optionally substituted heteroalicyclic group, an optionally substituted heteroaryl group, a halide, hydroxide, hydride, a carboxylate and water. More preferably, G is independently selected from water, an alcohol (e.g. methanol), a substituted or unsubstituted heteroaryl (imidazole, methyl imidazole (for example, N-methyl imidazole), pyridine, 4-dimethylaminopyridine, pyrrole, pyrazole, etc.), an ether (dimethyl ether, diethylether, cyclic ethers, etc.), a thioether, carbene, a phosphine, a phosphine oxide, a substituted or unsubstituted heteroalicyclic (morpholine, piperidine, tetrahydrofuran, tetrahydrothiophene, etc.), an amine, an alkyl amine trimethylamine, triethylamine, etc.), acetonitrile, an ester (ethyl acetate, etc.), an acetamide (dimethylacetamide, etc.), a sulfoxide (dimethylsulfoxide, etc.), a carboxylate, a hydroxide, hydride, a halide, a nitrate, a sulfonate, etc. In some embodiments, one or both instances of G is independently selected from optionally substituted heteroaryl, optionally substituted heteroaliphatic, optionally substituted heteroalicyclic, halide, hydroxide, hydride, an ether, a thioether, carbene, a phosphine, a phosphine oxide, an amine, an alkyl amine, acetonitrile, an ester, an acetamide, a sulfoxide, a carboxylate, a nitrate or a sulfonate. In certain embodiments, G may be a halide; hydroxide; hydride; water; a heteroaryl, heteroalicyclic or carboxylate group which are optionally substituted by alkyl, alkenyl, alkynyl, alkoxy, halogen, hydroxyl, nitro or nitrile. In preferred embodiments, G is independently selected from halide; water; a heteroaryl optionally substituted by alkyl (e.g. methyl, ethyl etc.), alkenyl, alkynyl, alkoxy (preferably methoxy), halogen, hydroxyl, nitro or nitrile. In some embodiments, one or both instances of G is negatively charged (for example, halide). In further embodiments, one or both instances of G is an optionally substituted heteroaryl. Exemplary G groups include chloride, bromide, pyridine, methylimidazole (for example N-methyl imidazole) and dimethylaminopyridine (for example, 4-methylaminopyridine).

It will be appreciated that when a G group is present, the G group may be associated with a single M metal centre as shown in formula (I), or the G group may be associated with both metal centres and form a bridge between the two metal centres, as shown below in formula (IIa)

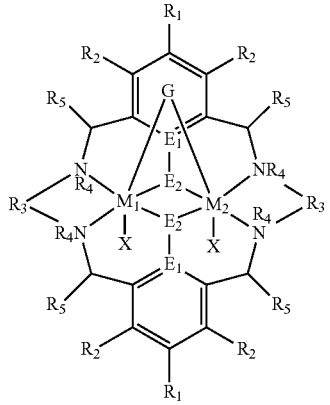

(IIa)

wherein $R_1$, $R_2$, $R_3$, $R_4$, $R_5$, $M_1$, $M_2$, G, X, $E_1$ and $E_2$, are as defined for formula (I) and formula (II).

The skilled person will understand that, in the solid state, the catalysts of the first aspect (i.e. catalysts of formula (I), (II) or any subset thereof) may be associated with solvent molecules such as water, or alcohol (e.g. methanol or ethanol). It will be appreciated that the solvent molecules may be present in a ratio of less than 1:1 relative to the molecules of catalyst of the first aspect (i.e. 0.2:1, 0.25:1, 0.5:1), in a ratio of 1:1, relative to the molecules of catalyst of the first aspect, or in a ratio of greater than 1:1, relative to the molecules of catalyst of the first aspect.

The skilled person will understand that, in the solid state, the catalysts of the first aspect may form aggregates. For example, the catalyst of the first aspect may be a dimer, a trimer, a tetramer, a pentamer, or higher aggregate.

Exemplary catalysts of formula (I) are as follows:

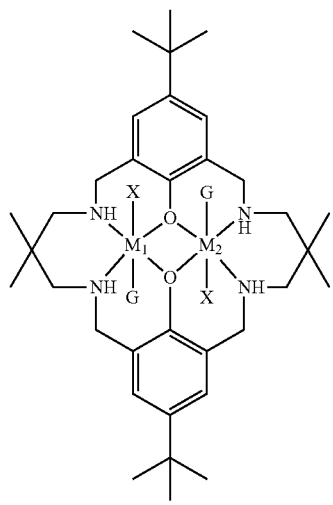

[$L^1M_1M_2(X)_2(G)_2$]

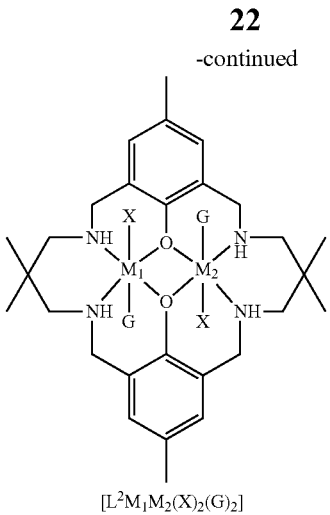

[$L^2M_1M_2(X)_2(G)_2$]

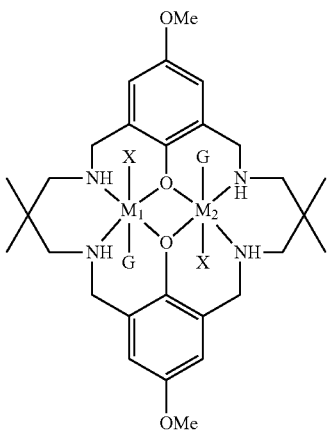

[$L^3M_1M_2(X)_2(G)_2$]

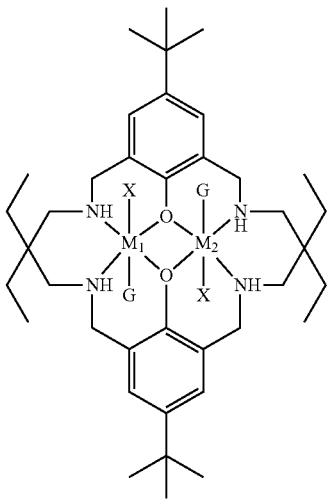

[$L^4M_1M_2(X)_2(G)_2$]

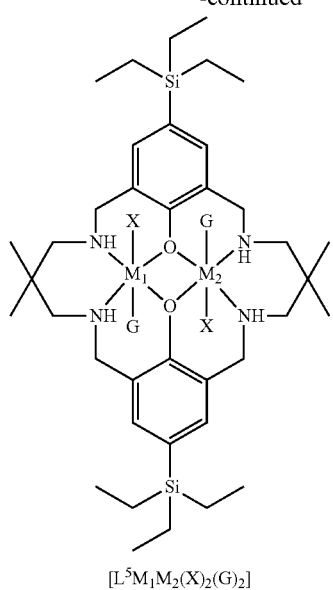
[L⁵M₁M₂(X)₂(G)₂]
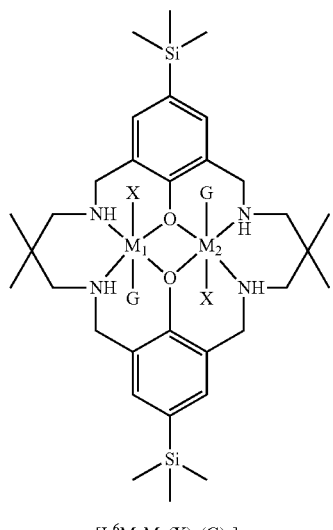
[L⁶M₁M₂(X)₂(G)₂]
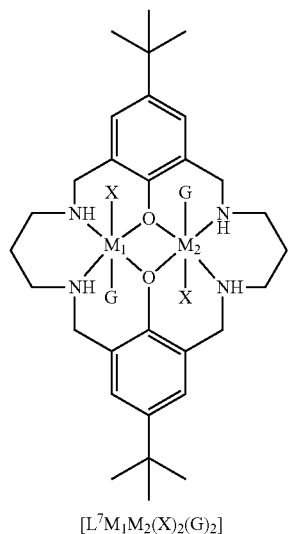
[L⁷M₁M₂(X)₂(G)₂]
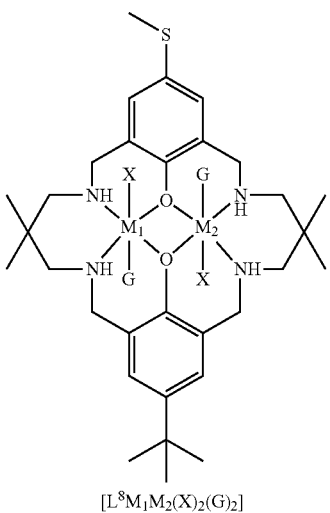
[L⁸M₁M₂(X)₂(G)₂]
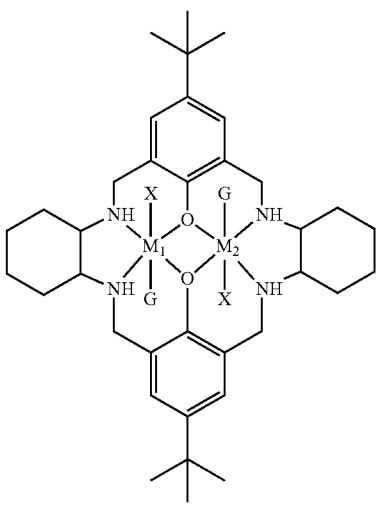
[L⁹M₁M₂(X)₂(G)₂]
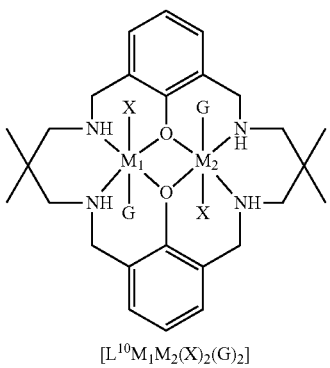
[L¹⁰M₁M₂(X)₂(G)₂]

-continued
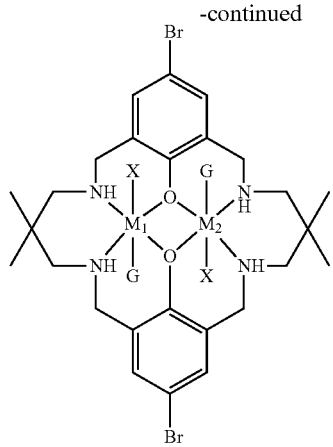
[L¹¹M₁M₂(X)₂(G)₂]
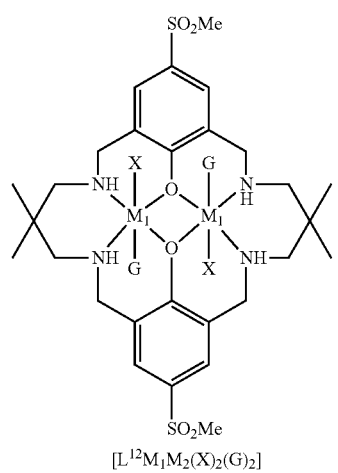
[L¹²M₁M₂(X)₂(G)₂]
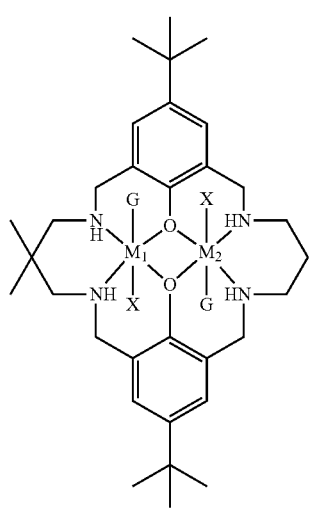
[L¹³M₁M₂(X)₂(G)₂]
-continued
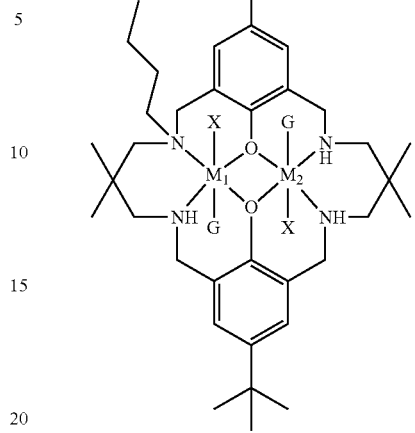
[L¹⁴M₁M₂(X)₂(G)₂]
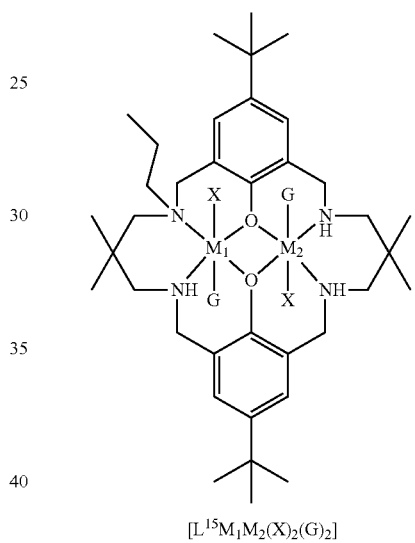
[L¹⁵M₁M₂(X)₂(G)₂]
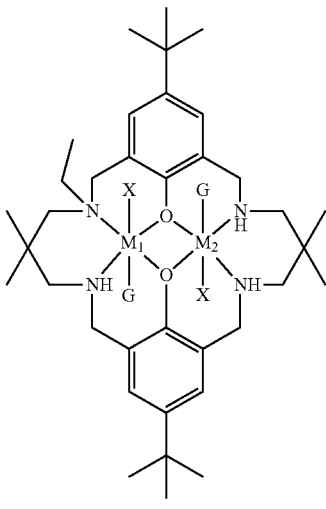
[L¹⁶M₁M₂(X)₂(G)₂]

-continued
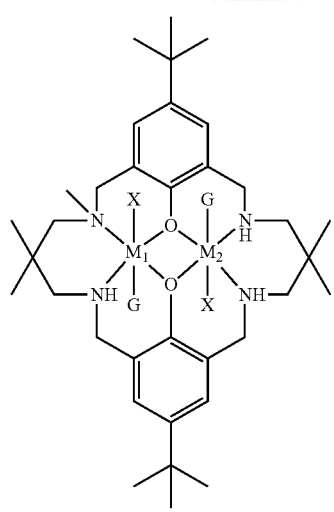
[L¹⁷M₁M₂(X)₂(G)₂]
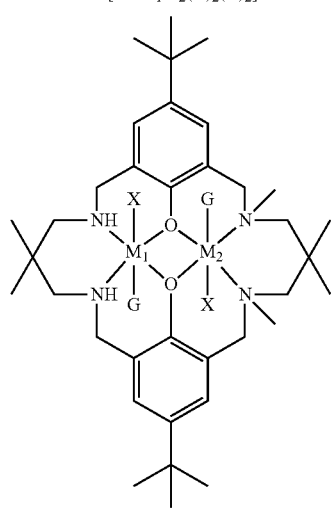
[L¹⁸M₁M₂(X)₂(G)₂]
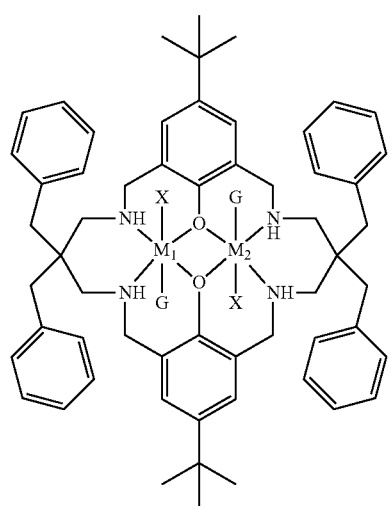
[L¹⁹M₁M₂(X)₂(G)₂]
-continued
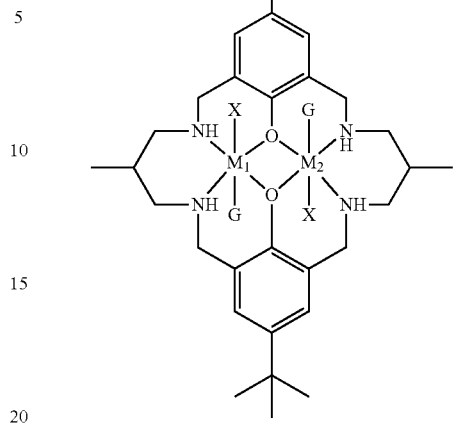
[L²⁰M₁M₂(X)₂(G)₂]
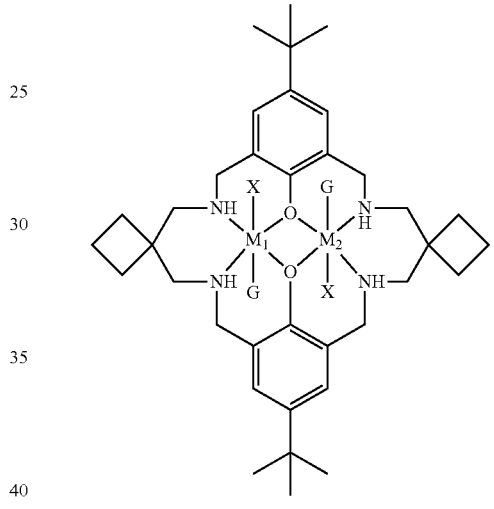
[L²¹M₁M₂(X)₂(G)₂]
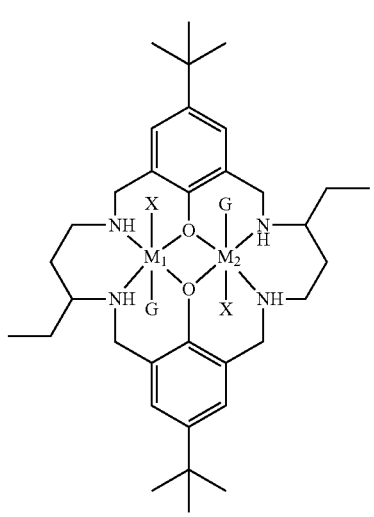
[L²²M₁M₂(X)₂(G)₂]

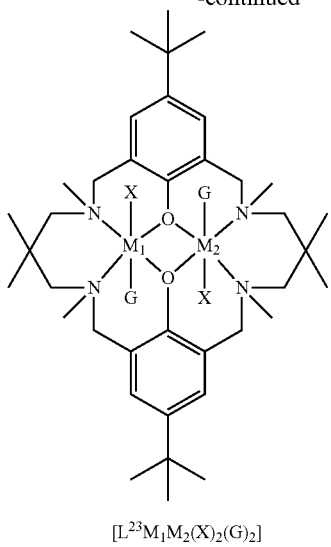

[L²³M₁M₂(X)₂(G)₂]

where $M_1$, $M_2$, G and X are as defined above for formula (I), and it will be appreciated that one or both G groups may be absent.

For example, at least one of $M_1$ and $M_2$ may be selected from Zn(II), Cr(III)-X, Co(II), Mn(II), Mg(II), Ni(II), Fe(II), and Fe(III)-X, e.g. at least one of $M_1$ and $M_2$ may be selected from Mg(II), Zn(II) and Ni(II), for example, at least one of $M_1$ and $M_2$ may be Ni(II).

As set out above, $M_1$ and $M_2$ may be the same or different. For example, $M_1$ and/or $M_2$ may be selected from Zn(II), Cr(III)-X, Co(II), Mn(II), Mg(II), Ni(II), Fe(II), and Fe(III)-X, preferably $M_1$ and/or $M_2$ is selected from Mg(II), Zn(II) and Ni(II), for example, $M_1$ and/or $M_2$ is Ni(II). Exemplary combinations of $M_1$ and $M_2$ include Mg(II)/Mg(II), Zn(II)/Zn(II), Ni(II)/Ni(II), Mg(II)/Zn(II), Mg(II)/Ni(II), Zn(II)/Ni(II).

For example, each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl (for example silyl), aryl or heteroaryl, e.g. each may be independently $OC(O)R^x$, $OR^x$, halide, carbonate, amino, nitro, alkyl, aryl, heteroaryl, phosphinate or $OSO_2R^x$. For example, $R^x$ may be alkyl, alkenyl, alkynyl, heteroalkyl, aryl, heteroaryl, cycloalkyl, or alkylaryl.

For example, if either G is present, G may be independently selected from halide; water; a heteroaryl optionally substituted by alkyl (e.g. methyl, ethyl etc.), alkenyl, alkynyl, alkoxy (preferably methoxy), halogen, hydroxyl, nitro or nitrile, e.g. one or both instances of G (if present) can be chloride, bromide, pyridine, methylimidazole (for example N-methyl imidazole) and dimethylaminopyridine (for example, 4-methylaminopyridine).

The skilled person will appreciate that the above definitions may be combined. For example, for the catalysts above, $M_1$ and $M_2$ may be the same or different, and may be selected from Zn(II), Cr(III)-X, Co(II), Mn(II), Mg(II), Ni(II), Fe(II), and Fe(III)-X; each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl (for example silyl), aryl or heteroaryl, e.g. each may be independently $OC(O)R^x$, $OR^x$, halide, carbonate, amino, nitro, alkyl, aryl, heteroaryl, phosphinate or $OSO_2R^x$; $R^x$ may be alkyl, alkenyl, alkynyl, heteroalkyl, aryl, heteroaryl, cycloalkyl, or alkylaryl; G may be absent or if present, may be independently selected from halide; water; a heteroaryl optionally substituted by alkyl (e.g. methyl, ethyl etc.), alkenyl, alkynyl, alkoxy (preferably methoxy), halogen, hydroxyl, nitro or nitrile.

Thus, the skilled person will understand that the above exemplary catalysts of formula (I) encompass, but are not restricted to, the following catalysts:

[L¹Ni₂(OAc)₂], [L¹Mg₂(OAc)₂], [L¹Zn₂(OAc)₂], [L¹MgZn(OAc)₂], [L¹MgNi(OAc)₂],

[L¹Ni₂(CO₂CF₃)₂], [L¹Mg₂ CO₂CF₃)₂], [L¹Zn₂(CO₂CF₃)₂], [L¹MgZn(CO₂CF₃)₂],

[L¹MgNi(CO₂CF₃)₂],

[L¹Ni₂(CO₂ᵗBu)₂], [L¹Mg₂(CO₂ᵗBu)₂], [L¹Zn₂(CO₂ᵗBu)₂], [L¹MgZn(CO₂ᵗBu)₂],

[L¹MgNi(CO₂ᵗBu)₂], [L¹Ni₂(OPh)₂], [L¹Mg₂(OPh)₂], [L¹Zn₂(OPh)₂], [L¹MgZn(OPh)₂],

[L¹MgNi(OPh)₂],

[L¹Ni₂(Ph)₂], [L¹Mg₂(Ph)₂], [L¹Zn₂(Ph)₂], [L¹MgZn(Ph)₂], [L¹MgNi(Ph)₂],

[L¹Ni₂(OⁱPr)₂], [L¹Mg₂(OⁱPr)₂], [L¹Zn₂(OⁱPr)₂], [L¹MgZn(OⁱPr)₂], [L¹MgNi(OⁱPr)₂],

[L¹Ni₂(C₆F₅)₂], [L¹Mg₂(C₆F₅)₂], [L¹Zn₂(C₆F₅)₂], [L¹MgZn(C₆F₅)₂], [L¹MgNi(C₆F₅)₂],

[L¹Ni₂Cl₂], [L¹Mg₂Cl₂], [L¹Zn₂Cl₂], [L¹MgZnCl₂], [L¹MgNiCl₂],

[L¹Ni₂Br₂], [L¹Mg₂Br₂], [L¹Zn₂Br₂], [L¹MgZnBr₂], [L¹MgNiBr₂],

[L¹Ni₂I₂], [L¹Mg₂I₂], [L¹Zn₂I₂], [L¹MgZnI₂], [L¹MgNiI₂], [L¹Ni₂(OC(O)(CH₂)₄CH₃)₂], [L¹Mg₂(OC(O)(CH₂)₄CH₃)₂], [L¹Zn₂(OC(O)(CH₂)₄CH₃)₂],

[L¹MgZn(OC(O)(CH₂)₆CH₃)₂], [L¹MgNi(OC(O)(CH₂)₆CH₃)₂],

[L¹Ni₂(OC(O)(CH₂)₁₀CH₃)₂], [L¹Mg₂(OC(O)(CH₂)₁₀CH₃)₂], [L¹Zn₂(OC(O)(CH₂)₆CH₃)₂],

[L¹MgZn(OC(O)(CH₂)₆CH₃)₂], [L¹MgNi(OC(O)(CH₂)₆CH₃)₂],

[L¹Ni₂(OC(O)(CH₂)₁₀CH₃)₂], [L¹Mg₂(OC(O)(CH₂)₁₀CH₃)₂], [L¹Zn₂(OC(O)(CH₂)₁₀CH₃)₂],

[L¹MgZn(OC(O)(CH₂)₁₀CH₃)₂], [L¹MgNi(OC(O)(CH₂)₁₀CH₃)₂],

[L¹Ni₂(OC(O)C₆F₅)₂], [L¹Mg₂(OC(O)C₆F₅)₂], [L¹Zn₂(OC(O)C₆F₅)₂], [L¹MgZn(OC(O)C₆F₅)₂],

[L¹MgNi(OC(O)C₆F₅)₂],

[L¹Ni₂Cl₂(methylimidazole)], [L¹Mg₂Cl₂(methylimidazole)], [L¹Zn₂Cl₂(methylimidazole)],

[L¹MgZnCl₂(methylimidazole)], [L¹MgNiCl₂(methylimidazole)],

[L¹Ni₂Cl₂(pyridine)], [L¹Mg₂Cl₂(pyridine)], [L¹Zn₂Cl₂(pyridine)], [L¹MgZnCl₂(pyridine)],

[L¹Mg NiCl₂(pyridine)]

[L¹Ni₂Cl₂(dimethylaminopyridine)], [L¹Mg₂Cl₂(dimethylaminopyridine)],

[L¹Zn₂Cl₂(dimethylaminopyridine)], [L¹MgZnCl₂(dimethylaminopyridine)],

[L¹MgNiCl₂(dimethylaminopyridine)],

[L¹Ni₂Br₂(dimethylaminopyridine)], [L¹Mg₂Br₂(dimethylaminopyridine)],

[L¹Zn₂Br₂(dimethylaminopyridine)], [L¹MgZnBr₂(dimethylaminopyridine)],

[L¹MgNiBr₂(dimethylaminopyridine)],

[L¹Ni₂(bis(4-methoxy)phenyl phosphinate)₂], [L¹Mg₂(bis(4-methoxy)phenyl phosphinate)₂],

[L¹Zn₂(bis(4-methoxy)phenyl phosphinate)₂], [L¹MgZn(bis(4-methoxy)phenyl phosphinate)₂], [L¹MgNi(bis(4-methoxy)phenyl phosphinate)₂],

[L¹Ni₂(adamantyl carbonate)₂], [L¹Mg₂(adamantyl carbonate)₂], [L¹Zn₂(adamantyl carbonate)₂], [L¹MgZn(adamantyl carbonate)₂], [L¹MgNi(adamantyl carbonate)₂],
[L¹Ni₂(diphenylphosphinate)₂], [L¹Mg₂(diphenylphosphinate)₂],
[L¹Zn₂(diphenylphosphinate)₂], [L¹MgZn(diphenylphosphinate)₂],
[L¹MgNi(diphenylphosphinate)₂],
[L²Ni₂(OAc)₂], [L²Mg₂(OAc)₂], [L²Zn₂(OAc)₂], [L²MgZn(OAc)₂], [L²MgNi(OAc)₂],
[L³Ni₂(OAc)₂], [L³Mg₂(OAc)₂], [L³Zn₂(OAc)₂], [L³MgZn(OAc)₂], [L³MgNi(OAc)₂],
[L⁴Ni₂(OAc)₂], [L⁴Mg₂(OAc)₂], [L⁴Zn₂(OAc)₂], [L⁴MgZn(OAc)₂], [L⁴MgNi(OAc)₂],
[L⁵Ni₂(OAc)₂], [L⁵Mg₂(OAc)₂], [L⁵Zn₂(OAc)₂], [L⁵MgZn(OAc)₂], [L⁵MgNi(OAc)₂],
[L⁶Ni₂(OAc)₂], [L⁶Mg₂(OAc)₂], [L⁶Zn₂(OAc)₂], [L⁶MgZn(OAc)₂], [L⁶MgNi(OAc)₂],
[L⁷Ni₂(OAc)₂], [L⁷Mg₂(OAc)₂], [L¹Zn₂(OAc)₂], [L¹MgZn(OAc)₂], [L¹MgNi(OAc)₂],
[L⁸Ni₂(OAc)₂], [L⁸Mg₂(OAc)₂], [L⁸Zn₂(OAc)₂], [L⁸MgZn(OAc)₂], [L⁸MgNi(OAc)₂],
[L⁹Ni₂(OAc)₂], [L⁹Mg₂(OAc)₂], [L⁹Zn₂(OAc)₂], [L⁹MgZn(OAc)₂], [L⁹MgNi(OAc)₂],
[L¹⁰Ni₂(OAc)₂], [L¹⁰Mg₂(OAc)₂], [L¹⁰Zn₂(OAc)₂], [L¹⁰MgZn(OAc)₂], [L¹⁰MgNi(OAc)₂],
[L¹¹Ni₂(OAc)₂], [L¹¹Mg₂(OAc)₂], [L¹¹Zn₂(OAc)₂], [L¹¹MgZn(OAc)₂], [L¹¹MgNi(OAc)₂],
[L¹²Ni₂(OAc)₂], [L¹²Mg₂(OAc)₂], [L¹²Zn₂(OAc)₂], [L¹²MgZn(OAc)₂], [L¹²MgNi(OAc)₂],
[L¹³Ni₂(OAc)₂], [L¹³Mg₂(OAc)₂], [L¹³Zn₂(OAc)₂], [L¹³MgZn(OAc)₂], [L¹³MgNi(OAc)₂],
[L¹⁴Ni₂(OAc)₂], [L¹⁴Mg₂(OAc)₂], [L¹⁴Zn₂(OAc)₂], [L¹⁴MgZn(OAc)₂], [L¹⁴MgNi(OAc)₂],
[L¹⁵Ni₂(OAc)₂], [L¹⁵Mg₂(OAc)₂], [L¹⁵Zn₂(OAc)₂], [L¹⁵MgZn(OAc)₂], [L¹⁵MgNi(OAc)₂],
[L¹⁶Ni₂(OAc)₂], [L¹⁶Mg₂(OAc)₂], [L¹⁶Zn₂(OAc)₂], [L¹⁶MgZn(OAc)₂], [L¹⁶MgNi(OAc)₂],
[L¹⁷Ni₂(OAc)₂], [L¹⁷Mg₂(OAc)₂], [L¹⁷Zn₂(OAc)₂], [L¹⁷MgZn(OAc)₂], [L¹⁷MgNi(OAc)₂],
[L¹⁸Ni₂(OAc)₂], [L¹⁸Mg₂(OAc)₂], [L¹⁸Zn₂(OAc)₂], [L¹⁸MgZn(OAc)₂], [L¹⁸MgNi(OAc)₂],
[L¹⁹Ni₂(OAc)₂], [L¹⁹Mg₂(OAc)₂], [L¹⁹Zn₂(OAc)₂], [L¹⁹MgZn(OAc)₂], [L¹⁹MgNi(OAc)₂],
[L²⁰Ni₂(OAc)₂], [L²⁰Mg₂(OAc)₂], [L²⁰Zn₂(OAc)₂], [L²⁰MgZn(OAc)₂], [L²⁰MgNi(OAc)₂],
[L²¹Ni₂(OAc)₂], [L²¹Mg₂(OAc)₂], [L²¹Zn₂(OAc)₂], [L²¹MgZn(OAc)₂], [L²¹ MgNi(OAc)₂],
[L²²Ni₂(OAc)₂], [L²²Mg₂(OAc)₂], [L²²Zn₂(OAc)₂], [L²²MgZn(OAc)₂], [L²²MgNi(OAc)₂],
[L²³Ni₂(OAc)₂], [L²³Mg₂(OAc)₂], [L²³Zn₂(OAc)₂], [L²³MgZn(OAc)₂], [L²³MgNi(OAc)₂],
[L¹Co₂(OAc)₃], [L¹ZnCoI₂], [L¹ZnFe(OAc)₂], [L¹ZnFeBr₂], [L¹ZnFeC₂], [L¹ZnFeI₂],
[L¹ZnCo(OAc)₂], [L¹ZnCoCl₂], [L¹ZnCoBr₂], [L¹Fe₂Cl₄], [L¹Co₂Cl₂(methylimidazole)],
[L¹Co₂Cl₂(pyridine)], [L¹CO₂Cl₃]⁻[H-DBU]⁺, and [L¹Co₂Cl₃]⁻[H-MTBD]⁺.

The skilled person will appreciate that in any of the above complexes, any one ligand defined by "L" may be replaced by another ligand defined by a different "L". For example, in complexes which refer to L¹, this ligand may be replaced by any of the ligands defined by L² to L²².

Double Metal Cyanide (DMC) Catalyst

DMC catalysts are complicated compounds which comprise at least two metal centres and cyanide ligands. The DMC catalyst may additionally comprise at least one of: one or more complexing agents, water, a metal salt and/or an acid (e.g. in non-stoichiometric amounts).

The first two of the at least two metal centres may be represented by M' and M".

M' may be selected from Zn(II), Ru(II), Ru(III), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), M' is preferably selected from Zn(II), Fe(II), Co(II) and Ni(II), even more preferably M' is Zn(II).

M" is selected from Fe(II), Fe(III), Co(II), Co(III), Cr(II), Cr(III), Mn(II), Mn(III), Ir(III), Ni(II), Rh(III), Ru(II), V(IV), and V(V), preferably M" is selected from Co(II), Co(III), Fe(II), Fe(III), Cr(III), Ir(III) and Ni(II), more preferably M" is selected from Co(II) and Co(III).

It will be appreciated that the above preferred definitions for M' and M" may be combined. For example, preferably M' may be selected from Zn(II), Fe(II), Co(II) and Ni(II), and M" may preferably selected form be Co(II), Co(III), Fe(II), Fe(III), Cr(III), Ir(III) and Ni(II). For example, M' may preferably be Zn(II) and M" may preferably be selected from Co(II) and Co(III).

If a further metal centre(s) is present, the further metal centre may be further selected from the definition of M' or M".

Examples of DMC catalysts which can be used in the method of the invention include those described in U.S. Pat. Nos. 3,427,256, 5,536,883, 6,291,388, 6,486,361, 6,608,231, 7,008,900, 5,482,908, 5,780,584, 5,783,513, 5,158,922, 5,693,584, 7,811,958, 6,835,687, 6,699,961, 6,716,788, 6,977,236, 7,968,754, 7,034,103, 4,826,953, 4,500,704, 7,977,501, 9,315,622, EP-A-1568414, EP-A-1529566, and WO 2015/022290, the entire contents of which are incorporated by reference.

DMC catalysts which are useful in the invention may be produced by treating a solution (such as an aqueous solution) of a metal salt with a solution (such as an aqueous solution) of a metal cyanide salt in the presence of one or more complexing agents, water, and/or an acid. Suitable metal salts include compounds of the formula M'(X')$_p$, wherein M' 35 is selected from Zn(II), Ru(II), Ru(III), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), and M' is preferably selected from Zn(II), Fe(II), Co(II) and Ni(II), even more preferably M' is Zn(II).

X' is an anion selected from halide, oxide, hydroxide, sulphate, carbonate, cyanide, oxalate, thiocyanate, isocyanate, isothiocyanate, carboxylate and nitrate, preferably X' is halide. p is an integer of 1 or more, and the charge on the anion multiplied by p satisfies the valency of M'. Examples of suitable metal salts include zinc chloride, zinc bromide, zinc acetate, zinc acetonylacetonate, zinc benzoate, zinc nitrate, iron(II) sulphate, iron (II) bromide, cobalt(II) chloride, cobalt(II) thiocyanate, nickel(II) formate, nickel(II) nitrate, and mixtures thereof.

Suitable metal cyanide salts include compounds of the formula (Y)q[M"(CN)$_b$(A)$_c$], wherein M" is selected from Fe(II), Fe(III), Co(II), Co(III), Cr(II), Cr(III), Mn(II), Mn(III), Ir(III), Ni(II), Rh(III), Ru(II), V(IV), and V(V), preferably M" is selected from Co(II), Co(III), Fe(II), Fe(III), Cr(III), Ir(III) and Ni(II), more preferably M" is selected from Co(II) and Co(III). Y is a proton (H⁺) or an alkali metal ion or an alkaline earth metal ion (such as K⁺), A is an anion selected from halide, oxide, hydroxide, sulphate, cyanide oxalate, thiocyanate, isocyanate, isothiocyanate, carboxylate and nitrate. q and b are integers of 1 or more, preferably b is 4 or 6. c may be 0 or an integer of 1 or more. The sum of the charges on the ions Y, CN and A multiplied by q, b and c respectively (e.g. Y x q+CN x b+A x c) satisfies the valency of M". Examples of suitable metal cyanide salts include potassium hexacyanocobaltate(III), potassium hexacyanoferrate(II), potassium hexacyanoferrate(II), calcium hexacyanocobaltate(III), lithium hexacyanocolbaltate(III), and mixtures thereof.

Suitable complexing agents include (poly)ethers, polyether carbonates, polycarbonates, poly(tetramethylene ether diol)s, ketones, esters, amides, alcohols, ureas and the like. Exemplary complexing agents include propylene glycol, polypropylene glycol (PPG), (m)ethoxy ethylene glycol, dimethoxyethane, tert-butyl alcohol, ethylene glycol monomethyl ether, diglyme, triglyme, methanol, ethanol, isopropyl alcohol, n-butyl alcohol, isobutyl alcohol, sec-butyl alcohol, 3-buten-1-ol, 2-methyl-3-buten-2-ol, 2-methyl-3-butyn-2-ol, 3-methyl-1-pentyn-3-ol etc. It will be appreciated that the alcohol may be saturated or may contain an unsaturated moiety (e.g. a double or triple bond). Multiple (i.e. more than one different type of) complexing agents may be present in the DMC catalysts used in the present invention.

The DMC catalyst may comprise a complexing agent which is a polyether, polyether carbonate or polycarbonate.

Suitable polyethers for use in the DMC catalyst of the present invention include those produced by ring-opening polymerisation of cyclic ethers, and include epoxide polymers, oxetane polymers, tetrahydrofuran polymers etc. Any method of catalysis can be used to make the polyethers. The polyethers can have any desired end groups, including, for example, hydroxyl, amine, ester, ether, or the like. Preferred polyethers for use in the DMC catalyst of the present invention are polyether polyols having between 2 and 8 hydroxyl groups. It is also preferred that polyethers for use in the DMC catalyst of the present invention have a molecular weight between about 1,000 Daltons and about 10,000 Daltons, more preferably between about 1,000 Daltons and about 5,000 Daltons. Polyether polyols useful in the DMC catalyst of the present invention include PPG polyols, EO-capped PPG polyols, mixed EO-PO polyols, butylene oxide polymers, butylene oxide copolymers with ethylene oxide and/or propylene oxide, polytetramethylene ether glycols, and the like. Preferred polyethers include PPGs, such as PPG polyols, particularly diols and triols, said PPGs having molecular weights of from about 250 Daltons to about 8,000 Daltons, more preferably from about 400 Daltons to about 4,000 Daltons.

Suitable polyether carbonates for use in the DMC catalyst of the present invention may be obtained by the catalytic reaction of alkylene oxides and carbon dioxide in the presence of a suitable starter or initiator compound. The polyether carbonates used as the complexing agent can also be produced by other methods known to the person skilled in the art, for example by partial alcoholysis of polycarbonate polyols with di- or tri-functional hydroxy compounds. The polyether carbonates used as complexing agents in the DMC catalyst of the present invention preferably have an average hydroxyl functionality of 1 to 6, more preferably 2 to 3, most preferably 2.

Suitable polycarbonates for use in the DMC catalyst of the present invention may be obtained by the polycondensation of difunctional hydroxy compounds (generally bis-hydroxy compounds such as alkanediols or bisphenols) with carbonic acid derivatives such as, for example, phosgene or bis[chlorocarbonyloxy] compounds, carbonic acid diesters (such as diphenyl carbonate or dimethyl carbonate) or urea. Methods for producing polycarbonates are generally well known and are described in detail in for example "Houben-Weyl, Methoden der organischen Chemie", Volume E20, Makromolekulare Stoffe, $4^{th}$ Edition, 1987, p. 1443-1457, "Ullmnann's Encyclopaedia of Industrial Chemistry", Volume A21, $5^{th}$ Edition, 1992, p. 207-215 and "Encyclopaedia of Polymer Science and Engineering", Volume 11, $2^{nd}$ Edition, 1988, p. 648-718. Aliphatic polycarbonate diols having a molecular weight of from about 500 Daltons to 5000 Daltons, most highly preferably from 1000 Daltons to 3000 Daltons, are particularly preferably used in the DMC catalyst of the present invention. These are generally obtained from non-vicinal diols by reaction with diaryl carbonate, dialkyl carbonate, dioxolanones, phosgene, bis-chloroformic acid esters or urea (see, for example, EP-A 292 772). Suitable non-vicinal diols are in particular 1,4-butanediol, neopentyl glycol, 1,5-pentanediol, 2-methyl-1,5-pentanediol, 3-methyl-1,5-pentanediol, 1,6-hexanediol, bis-(6-hydroxyhexyl)ether, 1,7-heptanediol, 1,8-octanediol, 2-methyl-1,8-octanediol, 1,9-nonanediol, 1,10-decanediol, 1,4-bis-hydroxymethyl cyclohexane, diethylene glycol, triethylene glycol, tetraethylene glycol, dipropylene glycol, tripropylene glycol, tetrapropylene glycol, alkoxylation products of diols with ethylene oxide and/or propylene oxide and/or tetrahydrofuran with molar masses up to 1000 Daltons, preferably between 200 Daltons and 700 Daltons, and in rarer cases the dimer diols, which are obtainable by reducing both carboxyl groups of dimer acids, which in turn can be obtained by dimerisation of unsaturated vegetable fatty acids. The non-vicinal diols can be used individually or in mixtures. The reaction can be catalysed by bases or transition metal compounds in the manner known to the person skilled in the art.

Other complexing agents that may be useful in present invention include poly(tetramethylene ether diols). Poly (tetramethylene ether diols) are polyether polyols based on tetramethylene ether glycol, also known as polytetrahydrofuran (PTHF) or polyoxybutylene glycol. These poly(tetramethylene ether diols) comprise two OH groups per molecule. They can be produced by cationic polymerisation of tetrahydrofuran (THF) with the aid of catalysts.

Complexing agents, as defined above, may be used to increase or decrease the crystallinity of the resulting DMC catalyst.

Suitable acids for use in the DMC catalyst of the present invention may have the formula $H_rX'''$, where $X'''$ is an anion selected from halide, sulfate, phosphate, borate, chlorate, carbonate, cyanide, oxalate, thiocyanate, isocyanate, isothiocyanate, carboxylate and nitrate, preferably $X'''$ is a halide. r is an integer corresponding to the charge on the counterion $X'''$. For example, when $X'''$ is $Cl^-$, r will be 1, i.e. the acid will be HCl.

If present, particularly preferred acids for use in the DMC catalyst of the present invention having the formula $H_rX'''$ include the following: HCl, $H_2SO_4$, $HNO_3$, $H_3PO_4$, HF, HI, HBr, $H_3BO_3$ and $HClO_4$. HCl, HBr and $H_2SO_4$ are particularly preferred.

It will also be appreciated that an alkali metal salt (e.g. an alkali metal hydroxide such as KOH, an alkali metal oxide or an alkali metal carbonate) may be added to the reaction mixture during synthesis of the DMC catalyst. For example, the alkali metal salt may be added to the reaction mixture after the metal salt $(M'(X')_p)$ has been added to the metal cyanide salt $((Y)q[M''(CN)_b(A)_c])$.

In one common preparation, an aqueous solution of zinc chloride (excess) is mixed with an aqueous solution of potassium hexacyanocobaltate, and a complexing agent (such as dimethoxyethane) is added to the resulting slurry. After filtration and washing of the catalyst with an aqueous solution of the complexing agent (e.g. aqueous dimethoxyethane), an active catalyst is obtained.

In an alternative preparation, several separate solutions may be prepared and then combined in order. For example, the following solutions may be prepared:
1. a solution of a metal cyanide (e.g. potassium hexacyanocobaltate)
2. a solution of a metal salt e.g. (zinc chloride (excess))
3. a solution of a first complexing agent (e.g. PPG diol)
4. a solution of a second complexing agent (e.g. tert-butyl alcohol).

In this method, solutions 1 and 2 are combined immediately, followed by slow addition of solution 4, preferably whilst stirring rapidly. Solution 3 may be added once the addition of solution 4 is complete, or shortly thereafter. The catalyst is removed from the reaction mixture via filtration, and is subsequently washed with a solution of the complexing agents.

If water is desired in the DMC catalyst, then the above solutions (e.g. solutions 1 to 4) may be aqueous solutions. However, it will be understood that anhydrous DMC catalysts (i.e. DMC catalysts without any water present) may be prepared if the solutions described in the above preparations are anhydrous solutions. To avoid hydrating the DMC catalyst and thereby introducing water molecules, any further processing steps (washing, filtration etc.) may be conducted using anhydrous solvents.

In one common preparation, several separate solutions may be prepared and then combined in order. For example, the following solutions may be prepared:
1. a solution of a metal salt (e.g. zinc chloride (excess)) and a second complexing agent (e.g. tert-butyl alcohol)
2. a solution of a metal cyanide (e.g. potassium hexacyanocobaltate)
3. a solution of a first and a second complexing agent (e.g. the first complexing agent may be a polymer (for example, polypropylene glycol diol) and the second complexing agent may be tert-butyl alcohol)

In this method, solutions 1 and 2 are combined slowly (e.g. over 1 hour) at a raised temperature (e.g. above 25° C., such as about 50° C.) while stirring (e.g. at 450 rpm). After addition is complete the stirring rate is increased for 1 hour (e.g. up to 900 rpm). The stirring rate is then decreased to a slow rate (e.g. to 200 rpm) and solution 3 is added quickly with low stirring. The mixture is filtered. The catalyst solids may be re-slurried in a solution of the second complexing agent at high stirring rate (e.g. about 900 rpm) before addition of the first complexing agent at low stirring rate (e.g. 200 rpm). The mixture is then filtered. This step may be repeated more than once. The resulting catalyst cake may be dried under vacuum (with heating e.g. to 60° C.).

Alternatively, after the mixture is first filtered it can be re-slurried at a raised temperature (e.g. above 25° C., such as about 50° C.) in a solution of the first complexing agent (and no second or further complexing agent) and then homogenized by stirring. It is then filtered after this step. The catalyst solids are then re-slurried in a mixture of the first and second complexing agents. For example, the catalyst solids are re-slurried in the second complexing agent at a raised temperature (e.g. above 25° C., such as about 50° C.) and subsequently the first complexing agent is added and mixture homogenized by stirring.

The mixture is filtered and the catalyst is dried under vacuum with heating (e.g. to 100° C.).

It will be appreciated that the DMC catalyst may comprise:

$$M'_d[M''_e(CN)_f]_g$$

wherein M' and M'' are as defined above, d, e, f and g are integers, and are chosen to such that the DMC catalyst has electroneutrality. Preferably, d is 3. Preferably, e is 1. Preferably f is 6. Preferably g is 2. Preferably, M' is selected from Zn(II), Fe(II), Co(II) and Ni(II), more preferably M' is Zn(II). Preferably M'' is selected from Co(III), Fe(III), Cr(III) and Ir(III), more preferably M'' is Co(III).

It will be appreciated that any of these preferred features may be combined, for example, d is 3, e is 1, f is 6 and g is 2, M' is Zn(II) and M'' is Co(III).

Suitable DMC catalysts of the above formula may include zinc hexacyanocobaltate(III), zinc hexacyanoferrate(III), nickel hexacyanoferrate(III), and cobalt hexacyanocobaltate (III).

There has been a lot of development in the field of DMC catalysts, and the skilled person will appreciate that the DMC catalyst may comprise, in addition to the formula above, further additives to enhance the activity of the catalyst. Thus, while the above formula may form the "core" of the DMC catalyst, the DMC catalyst may additionally comprise stoichiometric or non-stoichiometric amounts of one or more additional components, such as at least one complexing agent, an acid, a metal salt, and/or water.

For example, the DMC catalyst may have the following formula:

$$M'_d[M''_e(CN)_f]_g \cdot hM'''X''_i \cdot jR^c \cdot kH_2O \cdot lH_rX'''$$

wherein M', M'', X''', d, e, f and g are as defined above. M''' can be M' and/or M''. X'' is an anion selected from halide, oxide, hydroxide, sulphate, carbonate, cyanide, oxalate, thiocyanate, isocyanate, isothiocyanate, carboxylate and nitrate, preferably X'' is halide. i is an integer of 1 or more, and the charge on the anion X'' multiplied by i satisfies the valency of M'''. r is an integer that corresponds to the charge on the counterion X'''. For example, when X''' is Cr, r will be 1. l is 0, or a number between 0.1 and 5. Preferably, l is between 0.15 and 1.5.

$R^c$ is a complexing agent, and may be as defined above. For example, $R^c$ may be a (poly)ether, a polyether carbonate, a polycarbonate, a poly(tetramethylene ether diol), a ketone, an ester, an amide, an alcohol (e.g. a $C_1$a alcohol), a urea and the like, such as propylene glycol, polypropylene glycol, (m)ethoxy ethylene glycol, dimethoxyethane, tert-butyl alcohol, ethylene glycol monomethyl ether, diglyme, triglyme, methanol, ethanol, isopropyl alcohol, n-butyl alcohol, isobutyl alcohol, sec-butyl alcohol, 3-buten-1-ol, 2-methyl-3-buten-2-ol, 2-methyl-3-butyn-2-ol, 3-methyl-1-pentyn-3-ol, for example, $R^c$ may be tert-butyl alcohol, dimethoxyethane, or polypropylene glycol.

As indicated above, more than one complexing agent may be present in the DMC catalysts used in the present invention. A combination of the complexing agents tert-butyl alcohol and polypropylene glycol is particularly preferred.

It will be appreciated that if the water, complexing agent, acid and/or metal salt are not present in the DMC catalyst, h, j, k and/or l will be zero respectively. If the water, complexing agent, acid and/or metal salt are present, then h, j, k and/or l are a positive number and may, for example, be between 0 and 20. For example, h may be between 0.1 and 4. j may be between 0.1 and 6. k may be between 0 and 20, e.g. between 0.1 and 10, such as between 0.1 and 5. l may be between 0.1 and 5, such as between 0.15 and 1.5.

As set out above, DMC catalysts are complicated structures, and thus the above formula including the additional components is not intended to be limiting. Instead, the skilled person will appreciate that this definition is not exhaustive of the DMC catalysts which are capable of being used in the invention.

An exemplary DMC catalyst is of the formula $Zn_3[Co(CN)_6]_2 \cdot hZnCl_2 \cdot kH_2O \cdot j[(CH_3)_3COH]$, wherein h, k and l are as defined above. For example, h may be from 0 to 4 (e.g. from 0.1 to 4), k may be from 0 to 20 (e.g. from 0.1 to 10), and j may be from 0 to 6 (e.g. from 0.1 to 6).

Reaction Conditions

The method of the invention may be carried out at pressures of between about 1 bar and about 60 bar carbon dioxide, e.g. between about 1 bar and about 30 bar carbon dioxide, for example between about 1 to about 20 bar, such as between about 1 and about 15 bar carbon dioxide.

The method of the invention is capable of preparing polyether carbonates at pressures that are within the limits of existing polyether carbonate equipment used in industry (e.g. 10 bar or less). Therefore, the method of the invention is capable being carried out at pressures of between about 1 bar and about 10 bar, for example, the reaction is capable of being carried out at a pressure of about 5 bar or less carbon dioxide. Under these conditions, the method of the invention is still capable of producing polyether carbonates having a varying amount of carbonate linkages, and may produce a polyether carbonate having a high content of carbonate linkages.

The method of the invention may be carried out in the presence of a solvent, however it will also be appreciated that the reaction may be carried out in the absence of a solvent.

If the method of the invention is performed in the presence of a solvent, preferred solvents may be selected from hexane, toluene, diethyl carbonate, dimethyl carbonate, dioxane, dichlorobenzene, methylene chloride, propylene carbonate, ethylene carbonate, acetone, ethyl acetate, propyl acetate, n-butyl acetate, t-butyl acetate and tetrahydrofuran (THF). Hexane, toluene, ethyl acetate, acetone and n-butyl acetate are particularly preferred solvents for use in the present invention, if a solvent is present.

The epoxide which is used in the method may be any containing an epoxide moiety. Exemplary epoxides include ethylene oxide, propylene oxide, butylene oxide and cyclohexene oxide.

The epoxide may be purified (for example by distillation, such as over calcium hydride) prior to reaction with carbon dioxide. For example, the epoxide may be distilled prior to being added to the reaction mixture comprising the catalysts.

The process may be carried out at a temperature of about 0° C. to about 250° C., for example from about 40° C. to about 140° C., e.g. from about 50° C. to about 110° C., such as from about 60° C. to about 100° C., for example from about 70° C. to about 100° C., e.g. from about 55° C. to about 80° C. The duration of the process may be up to about 168 hours, such as from about 1 minute to about 24 hours, for example from about 5 minutes to about 12 hours, e.g. from about 1 to about 6 hours.

The method of the invention may be carried out at low catalytic loading. For example, the catalytic loading of the catalyst of formula (I) may be in the range of about 1:1,000-300,000 [catalyst of formula (I)]:[epoxide], such as about 1:1,000-100,000 [catalyst of formula (I)]:[epoxide], e.g. in the region of about 1:10000-50,000 [catalyst of formula (I)]:[epoxide], for example in the region of about 1:10,000 [catalyst of formula (I)]:[epoxide]. The ratios above are molar ratios.

The ratio of the catalyst of formula (I) to the DMC catalyst may be in the range of from about 300:1 to about 0.1:1, for example, from about 120:1 to about 0.25:1, such as from about 40:1 to about 0.5:1, e.g. from about 30:1 to about 0.75:1 such as from about 20:1 to about 1:1, for example from about 10:1 to about 2:1, e.g. from about 5:1 to about 3:1. These ratios are mass ratios.

The method may be a batch reaction, a semi-continuous reaction, or a continuous reaction.

Polyether Carbonates

The method of the invention is capable of preparing high molecular weight polyether carbonates.

The method of the invention is capable of producing polyether carbonates in which the amount of ether and carbonate linkages can be controlled. Thus, the invention provides a polyether carbonate which has n ether linkages and m carbonate linkages, wherein n and m are integers, and wherein m/(n+m) is from greater than zero to less than 1.

For example, the method of the invention is capable of preparing polyether carbonates having a wide range of m/(n+m) values. It will be understood that m/(n+m) may be about 0.05, about 0.10, about 0.15, about 0.20, about 0.25, about 0.25, about 0.30, about 0.35, about 0.40, about 0.45, about 0.50, about 0.55, about 0.60, about 0.65, about 0.70, about 0.75, about 0.80, about 0.85, about 0.90, about 0.95, or within any range prepared from these specific values. For example, m/(n+m) may be from about 0.05 to about 0.95, from about 0.10 to about 0.90, from about 0.15 to about 0.85, from about 0.20 to about 0.80, or from about 0.25 to about 0.75, etc.

Thus, the method of the invention makes it possible to prepare polyether carbonates having a high proportion of carbonate linkages, e.g. m/(n+m) may be greater than about 0.50, such as from greater than about 0.55 to less than about 0.95, e.g. about 0.65 to about 0.90, e.g. about 0.75 to about 0.90. The method of the invention is able to prepare polymers having a high ratio of m/(n+m) under mild conditions, for example, under pressures of about 20 bar or below, such as 10 bar or below.

For example, the polyether carbonates produced by the method of the invention may have the following formula (IV):

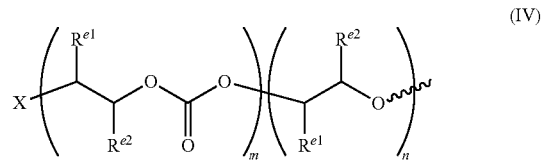

(IV)

It will be appreciated that the identity of X will depend on the nature of X in the compound of formula (I), and that the identity of $R^{e1}$ and $R^{e2}$ will depend on the nature of the epoxide used to prepare the polyether carbonate. "m" and "n" define the amount of the carbonate and ether linkages in the polyether carbonate. It will be appreciated that n≤1 and m≤1.

It will be understood that in preferred embodiments, X is not a group containing —OH.

The skilled person will understand that in the polymers of formula (IV), the adjacent epoxide monomer units in the backbone may be head-to-tail linkages, head-to-head linkages or tail-to-tail linkages.

It will also be appreciated that formula (IV) does not require the carbonate links and the ether links to be present in two distinct "blocks" in each of the sections defined by "m" and "n", but instead the carbonate and ether repeating units may be statistically distributed along the polymer backbone, or may be arranged so that the carbonate and ether linkages are not in two distinct blocks.

Thus, the polyether carbonate prepared by the method of the invention (e.g. a polymer of formula (IV)) may be referred to as a random copolymer, a statistical copolymer, an alternating copolymer, or a periodic copolymer.

The skilled person will appreciate that the wt % of carbon dioxide incorporated into a polymer will be directly proportional to the number of carbonate linkages in the polymer backbone.

All other things being equal, polyethers have higher temperatures of degradation than polycarbonates produced from epoxides and carbon dioxide. Therefore, a polyether carbonate having a statistical or random distribution of ether and carbonate linkages will have a higher temperature of degradation than a polycarbonate, or a polyether carbonate having blocks of carbonate linkages. Temperature of thermal degradation can be measured using thermal gravimetric analysis (TGA).

As set out above, the method of the invention prepares a random copolymer, a statistical copolymer, an alternating copolymer, or a periodic copolymer. Thus, the carbonate linkages are not in a single block, thereby providing a polymer which has improved properties, such as improved thermal degradation, as compared to a polycarbonate. Preferably, the polyether carbonate prepared by the method of the invention is a random copolymer or a statistical copolymer.

The polyether carbonate prepared by the method of the invention may be of formula (IV), in which n and m are integers of 1 or more, the sum of all m and n groups is from 4 to 200, and wherein m/(m+n) is in the range of from greater than zero to less than 1.00. As set out above, m/(n+m) may be from about 0.05, about 0.10, about 0.15, about 0.20, about 0.25, about 0.25, about 0.30, about 0.35, about 0.40, about 0.45, about 0.50, about 0.55, about 0.60, about 0.65, about 0.70, about 0.75, about 0.80, about 0.85, about 0.90, about 0.95, or within any range prepared from these specific values. For example, m/(n+m) may be from about 0.05 to about 0.95, from about 0.10 to about 0.90, from about 0.15 to about 0.85, from about 0.20 to about 0.80, or from about 0.25 to about 0.75, etc.

The skilled person will also appreciate that the polyether carbonate must contain at least one carbonate and at least one ether linkage e.g. n≥1 and m≥1. Therefore it will be understood that the number of ether and carbonate linkages (n+m) in the polyether carbonate will define the molecular weight of the polymer. For example, preferably n≥5 and m≥5, or n≥10 and m≥10, or n≥20 and m≥20, or n≥50 and m≥50.

Preferably, m+n≥10, or m+n≥20, or m+n≥100, or m+n≥200, or m+n≥500, or m+n≥1,000.

Each $R^{e1}$ may be independently selected from H, halogen, hydroxyl, or optionally substituted alkyl, alkenyl, alkynyl, cycloalkyl, heterocycloalkyl, aryl, heteroaryl, heteroalkyl or heteroalkenyl. Preferably $R^{e1}$ may be selected from H or optionally substituted alkyl.

Each $R^{e2}$ may be independently selected from H, halogen, hydroxyl, or optionally substituted alkyl, alkenyl, alkynyl, cycloalkyl, heterocycloalkyl, aryl, heteroaryl, heteroalkyl or heteroalkenyl. Preferably $R^{e2}$ may be selected from H or optionally substituted alkyl.

It will also be appreciated that $R^{e1}$ and $R^{e2}$ may together form a saturated, partially unsaturated or unsaturated ring containing carbon and hydrogen atoms, and optionally one or more heteroatoms (e.g. O, N or S). For example, $R^{e1}$ and $R^{e2}$ may together form a 5 or six membered ring.

As set out above, the nature of $R^{e1}$ and $R^{e2}$ will depend on the epoxide used in the reaction. If the epoxide is cyclohexene oxide (CHO), then $R^{e1}$ and $R^{e2}$ will together form a six membered alkyl ring (e.g. a cyclohexyl ring). If the epoxide is ethylene oxide, then $R^{e1}$ and $R^{e2}$ will both be H. If the epoxide is propylene oxide, then $R^{e1}$ will be H and $R^{e2}$ will be methyl (or $R^{e1}$ will be methyl and $R^{e2}$ will be H, depending on how the epoxide is added into the polymer backbone). If the epoxide is butylene oxide, then $R^{e1}$ will be H and $R^{e2}$ will be ethyl (or vice versa). If the epoxide is styrene oxide, then $R^{e1}$ may be hydrogen, and $R^{e2}$ may be phenyl (or vice versa).

It will also be appreciated that if a mixture of epoxides are used, then each occurrence of $R^{e1}$ and/or $R^{e2}$ may not be the same, for example if a mixture of ethylene oxide and propylene oxide are used, $R^{e1}$ may be independently hydrogen or methyl, and $R^{e2}$ may be independently hydrogen or methyl.

Thus, $R^{e1}$ and $R^{e2}$ may be independently selected from hydrogen, alkyl or aryl, or $R^{e1}$ and $R^{e2}$ may together form a cyclohexyl ring, preferably $R^{e1}$ and $R^{e2}$ may be independently selected from hydrogen, methyl, ethyl or phenyl, or $R^{e1}$ and $R^{e2}$ may together form a cyclohexyl ring.

X depends on the nature of the group X used in the compound of formula (I). Thus, X may be selected from $OC(O)R^x$, $OSO_2R^x$, $OSOR^x$, $OSO(R^x)_2$, $S(O)R^x$, $OR^x$, phosphinate, halide, nitrate, hydroxyl, carbonate, amino, amido or optionally substituted aliphatic, heteroaliphatic, alicyclic, heteroalicyclic, aryl or heteroaryl, where $R_x$ is independently hydrogen, or optionally substituted aliphatic, haloaliphatic, heteroaliphatic, alicyclic, heteroalicyclic, aryl, alkylaryl or heteroaryl.

Preferably each X is independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl, (for example silyl), aryl or heteroaryl. Even more preferably, each X is independently $OC(O)R^x$, $OR^x$, halide, carbonate, amino, nitro, alkyl, aryl, heteroaryl, phosphinate or $OSO_2R^x$. Preferred optional substituents for when X is aliphatic, heteroaliphatic, alicyclic, heteroalicyclic, aryl or heteroaryl include halogen, hydroxyl, nitro, cyano, amino, or substituted or unsubstituted aliphatic, heteroaliphatic, alicyclic, heteroalicyclic, aryl or heteroaryl.

Exemplary options for X include OAc, $OC(O)CF_3$, halogen, $OSO(CH_3)_2$, Et, Me, OMe, OiPr, OtBu, Cl, Br, I, F, $N(iPr)_2$ or $N(SiMe_3)_2$, OPh, OBn, salicylate, dioctyl phosphinate, etc.

If more than one X group is present, for example in a compound of formula (IV-A) as shown below, each X may be the same or different and preferably each X is the same.

Preferably, $R^x$ is alkyl, alkenyl, alkynyl, heteroalkyl, aryl, heteroaryl, cycloalkyl, or alkylaryl. Preferred optional substituents for $R^x$ include halogen, hydroxyl, cyano, nitro, amino, alkoxy, alkylthio, or substituted or unsubstituted aliphatic, heteroaliphatic, alicyclic, heteroalicyclic, aryl or heteroaryl (e.g. optionally substituted alkyl, aryl, or heteroaryl).

Preferably each X is the same, and is selected from $OC(O)R^x$, $OR^x$, halide, carbonate, amino, nitro, alkyl, aryl, heteroaryl, phosphinate or $OSO_2R^x$, $R^x$ is alkyl, alkenyl, alkynyl, heteroalkyl, aryl, heteroaryl or alkylaryl. More preferably each X is the same and is $OC(O)R^x$, $OR^x$, halide, alkyl, aryl, heteroaryl, phosphinate or $OSO_2R^x$. Still more preferably each X is the same and is $OC(O)R^x$. More preferably still each X is the same and is selected from OAc, $O_2CCF_3$, or $O_2C(CH_2)_3Cy$. Most preferably each X is the same and is OAc.

Preferably each $R^x$ is the same and is selected from an optionally substituted alkyl, alkenyl, alkynyl, heteroalkyl, aryl, heteroaryl, cycloalkyl or alkylaryl. More preferably each $R^x$ is the same and is an optionally substituted alkyl, alkenyl, heteroalkyl, aryl, heteroaryl, cycloalkyl or alkylaryl. Still more preferably each $R^x$ is the same and is an optionally substituted alkyl, alkenyl, heteroalkyl; or cycloalkyl. More preferably still $R^x$ is an optionally substituted alkyl, heteroalkyl or cycloalkyl. Most preferably $R^x$ is an optionally substituted alkyl.

It will be appreciated that preferred definitions for X and preferred definitions for $R^x$ may be combined. For example, each X may be independently $OC(O)R^x$, $OSO_2R^x$, $OS(O)R^x$, $OSO(R^x)_2$, $S(O)R^x$, $OR^x$, halide, nitrate, hydroxyl, carbonate, amino, nitro, amido, alkyl (e.g. branched alkyl), heteroalkyl, (for example silyl), aryl or heteroaryl, e.g. each may be independently $OC(O)R^x$, $OR^x$, halide, carbonate, amino, nitro, alkyl, aryl, heteroaryl, phosphinate or $OSO_2R^x$, and $R^x$ may be optionally substituted alkyl, alkenyl, alkynyl, heteroalkyl, aryl, heteroaryl, cycloalkyl, or alkylaryl.

The skilled person will understand that each of the above features may be combined. For example, $R^{e1}$ and $R^{e2}$ may be independently selected from hydrogen, alkyl or aryl, or $R^{e1}$ and $R^{e2}$ may together form a cyclohexyl ring, X may be optionally substituted aliphatic or heteroaliphatic, e.g. alkylene or heteroalkylene.

The polyether carbonates produced by the method of the invention are preferably high molecular weight polyether carbonates. It will be appreciated that the nature of the epoxide used to prepare the polyether carbonate will have an impact on the resulting molecular weight of the product. Thus, the lower limit of n+m is used herein to define "high molecular weight" polymers of the invention.

Preferably, the polymers produced by the method of the invention may have a molecular weight of at least about 25,000 Daltons, such as at least about 40,000 Daltons, e.g. at least about 50,000 Daltons, or at least about 100,000 Daltons, such as between about 50,000 Daltons and 1,000,000 Daltons. High molecular weight polymers formed by the method of the present invention typically have molecular weights above about 100,000 Daltons.

The method of the invention can advantageously prepare a polyether carbonate having a large molecular weight distribution. In other words, the polyether carbonate may have a relatively high polydispersity index (PDI). The PDI of a polymer is determined by dividing the weight average molecular weight ($M_w$) by the number average molecular weight ($M_n$) of a polymer, thereby indicating the distribution of the chain lengths in the polymer product. For high molecular weight polymers, a large PDI can be desirable as the short chains act as plasticisers for the longer chains, thereby preventing the polymer from becoming too brittle.

Preferably the polymers produced by the method of the invention have a PDI of greater than about 1, preferably greater than about 2, more preferably greater than about 3.

The $M_n$ and $M_w$, and hence the PDI of the polymers produced by the method of the invention may be measured using Gel Permeation Chromatography (GPC). For example, the GPC may be measured using an Agilent 1260 Infinity GPC machine with two Agilent PLgel μ-m mixed-E columns in series. The samples may be measured at room temperature (293K) in THF with a flow rate of 1 mL/min against narrow polystyrene standards (e.g. polystyrene low easivials supplied by Agilent Technologies with a range of Mn from 405 to 49,450 g/mol). Optionally, the samples may be measured against poly(ethylene glycol) standards, such as polyethylene glycol EasiVials supplied by Agilent Technologies.

The invention also provides a polymerisation system for the copolymerisation of carbon dioxide and an epoxide, comprising:

d. a catalyst of formula (I) as defined herein, and
e. a DMC catalyst as defined herein.

There is herein disclosed a catalyst of formula (IIb):

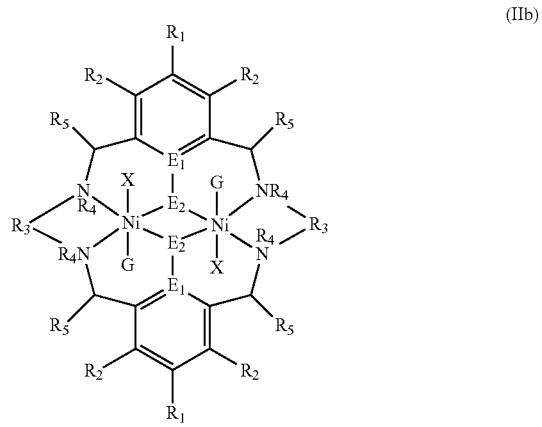

(IIb)

wherein $R_1$, $R_2$, $R_3$, $R_5$, G, X, $E_1$ and $E_2$, are as defined for formula (I) or formula (II). Each $R_4$ is independently selected from an optionally substituted alkyl, alkenyl, alkynyl, aryl, heteroalkyl, heteroalkenyl, heteroalkynyl, heteroaryl, -alkylC(O)OR$_{19}$ or -alkylC≡N, preferably each $R_4$ is independently selected from an optionally substituted alkyl, aryl, heteroalkyl, or heteroaryl group. Each $R_4$ may be the same or different. Preferably each $R_4$ is the same. For example, each $R_4$ is the same and is selected from optionally substituted alkyl, aryl, heteroalkyl, or heteroaryl group. Exemplary $R_4$ groups include optionally substituted methyl, ethyl, propyl, butyl, cyclohexyl and phenyl.

It will be appreciated that each of the preferred definitions as set out for formula (I) and formula (II) may equally be applied to formula (IIb).

It will be understood that the compound of formula (IIb) may have the following structure:

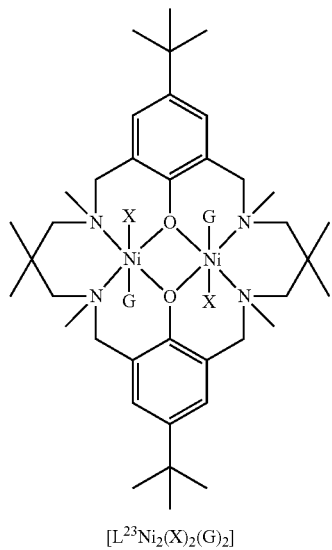

[L$^{23}$Ni$_2$(X)$_2$(G)$_2$]

wherein X and G are as defined for formula (I) or formula (II).

It will be appreciated that the catalyst of formula (IIb) may be used in the method of the present invention.

EXAMPLES

Methods

Nuclear Magnetic Resonance Spectroscopy $^1$H NMR spectra were recorded on a Bruker AV-400 instrument, using the solvent CDCl$_3$.

The assessment of polyether and polycarbonate content of the polyethercarbonate has been reported in a number of different ways. In order to calculate the molar carbonate content and the CO$_2$ wt % in the polyethercarbonate, the method described in US2014/0323670 was used herein. The method is as follows:

The relevant resonances in the $^1$H-NMR spectra used for integration are:

TABLE A

| $^1$H NMR resonance (ppm) | Protons from repeating units | No of protons |
|---|---|---|
| A(1.08-1.18) | CH$_3$ of Polyether | 3 |
| B(1.26-1.38) | CH$_3$ of Polycarbonates | 3 |
| C(1.45-1.49) | CH$_3$ of cyclic carbonate | 3 |
| D(2.95-2.99) | CH of propylene oxide | 1 |

The resonances A, B and C have been previously defined for polyethercarbonates containing a low proportion of carbonate linkages in the methods described in US2014/0323670.

Carbonate/ether ratio (m/n+m): molar ratio of carbonate and ether linkages:

$$\frac{m}{m+n} = Rc = \frac{B}{A+B} \quad \text{(Equation 1)}$$

CO$_2$ wt % in polyol: amount of CO$_2$ incorporated into the total polyol:

$$\text{CO2 wt \%} = \frac{(B) \times 44}{(A \times 58) + ((B) \times 102)} \times 100 \quad \text{(Equation 2)}$$

Wherein 44 is the mass of CO$_2$ within a carbonate unit, 58 is the mass of a polyether unit, 102 is the mass of a polycarbonate unit.

Furthermore, resonance B can be broken down into two different resonances. From 1.26-1.32 ppm (B$^1$) corresponds to the propylene CH$_3$ in a polymer unit between a carbonate and an ether linkage (a polyethercarbonate, PEC linkage) whilst the resonance from 1.32-1.38 ppm (B$^2$) comes from a propylene CH$_3$ in a polymer unit in between two carbonate linkages (a polycarbonate, PC linkage). The ratio of PEC, PC and PE linkages gives an indication of the structure of the polymer. A completely blocked structure will contain very few PEC linkages (only those at the block interfaces), whilst a more random structure will include a significant proportion of PEC linkages where both polyether and polycarbonate units are adjacent to each other in the polymer backbone. The ratio of these two units gives an indication of the structure.

Polyethercarbonate/polycarbonate linkage ratio:

$$R_{PEC} = \frac{B^1}{B^1 + B^2}$$

Gel Permeation Chromatography

GPC measurements were carried out against narrow polydispersity poly(ethylene glycol) or polystyrene standards in THF using an Agilent 1260 Infinity machine equipped with Agilent PLgel Mixed-D columns.

Mass Spectroscopy

All mass spectrometry measurements were performed using a MALDI micro MX micromass instrument.

Example 1

Synthesis of DMC Catalyst A

The DMC catalyst used in this example was prepared according to the method reported in Journal of Polymer Science; Part A: Polymer Chemistry, 2002, 40, 1142. In brief, 1.0 g of K$_3$Co(CN)$_6$ was dissolved in a mixture solvent of 13 g distilled water and 2 g tert-butyl alcohol. 6 g of ZnCl$_2$ was dissolved in a mixture solvent of 13 g water and 4 g tert-butyl alcohol, and then this mixture was added slowly to the K$_3$Co(CN)$_6$ solution over a period of 20 minutes, whilst stirring. The mixture was then stirred for a further 40 minutes and then centrifugal separation was performed to yield a white precipitate. The precipitate was dispersed in a mixture solvent of 16 g water and 16 g tert-butyl alcohol, and stirred for 20 minutes, and then the precipitate was separated by centrifuge. This washing procedure was repeated 3 times. The white precipitate was then dispersed in 50 g tert-butyl alcohol, and then stirred for 20 minutes, followed by centrifugal separation to obtain a white precipitate. The washing with tert-butyl alcohol was then repeated once more. The solvent was then removed under reduced pressure at 60° C. for 8 hours. The resultant compound is understood to have the formula Zn$_3$[Co(CN)$_6$]$_2$.hZnCl$_2$.0.5H$_2$O.2[(CH$_3$)$_3$COH].

Example 2

Synthesis of DMC Catalyst B

The synthesis described in Example 1 of U.S. Pat. No. 5,482,908 was followed except the 4000 molecular weight polypropylene glycol diol was replaced with a 2000 molecular weight polypropylene glycol diol:

Potassium hexacyanocobaltate (8.0 g) was dissolved in deionised (DI) water (140 mL) in a beaker (solution 1). Zinc chloride (25 g) was dissolved in DI water (40 mL) in a second beaker (solution 2). A third beaker containing solution 3 was prepared: a mixture of DI water (200 mL), tert-butyl alcohol (2 mL) and polyol (2 g of a 2000 mol. wt. polypropylene glycol diol). Solutions 1 and 2 were mixed together using a mechanical stirrer. Immediately a 50/50 (by volume) mixture of tert-butyl alcohol and DI water (200 mL total) was added to the zinc hexacyanocobaltate mixture, and the product was stirred vigorously for 10 min. Solution 3 (polyol/water/tert-butyl alcohol mixture) was added to the aqueous slurry of zinc hexacyanocobaltate and the product stirred magnetically for 3 min. The mixture was filtered under pressure to isolate the solids. The solid cake was reslurried in tert-butyl alcohol (140 mL), DI water (60 mL), and an additional 2 g of the 2000 mol. wt. polypropylene glycol diol. Then mixture was stirred vigorously for 10 min. and filtered. The solid cake was reslurried in tert-butyl alcohol (200 mL) and an additional 1 g of 2000 mol. 10 wt. polypropylene glycol diol and stirred vigorously for 10 minutes, then filtered. The resulting solid catalyst was dried under vacuum (<1 mbar) at 50° C. to constant weight.

The yield of dry, powdery catalyst was 8.5 g.

Example 3

Synthesis of [L¹Ni₂(OAc)₂], Catalyst 1

Ligand H₂L¹ was synthesised by the method previously described by Kember et al, Angew. Chem. Int. Ed., 2009, 48, 931-933.

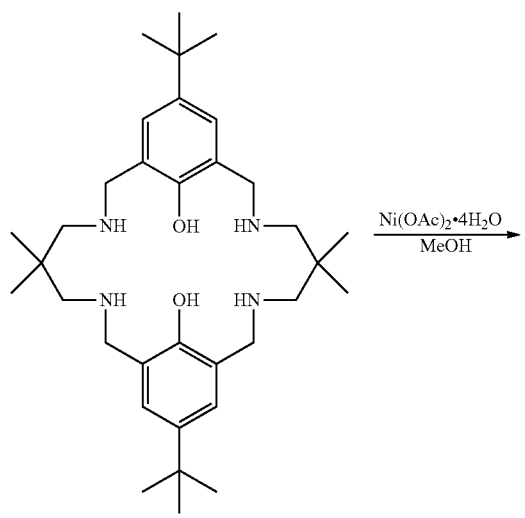

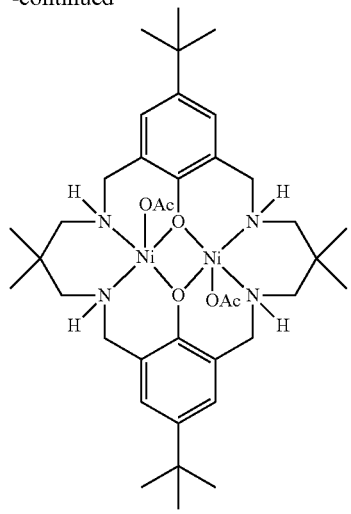

H₂L¹ (2 mmol) was dissolved in MeOH (50 mL), then Ni(OAc)₂·4H₂O (0.498 g, 4 mmol) was added portionwise over 15 minutes and the solution stirred overnight. The solvent was removed under vacuum and excess water/AcOH was removed by azeotrope with toluene (3×40 mL).

[L¹Ni₂(OAc)₂]: IR ($\upsilon_{C=O}$, cm⁻¹, neat): 1581 and 1413. MALDI-TOF MS: m/z: 727.6 ([M-OAc]⁺, 100%).

Example 4

Synthesis of [L²Ni₂(OAc)₂]—Catalyst 2

Catalyst [L²Ni₂(OAc)₂]—2 was prepared as per catalyst 1 except using a methylated macrocyclic ligand.

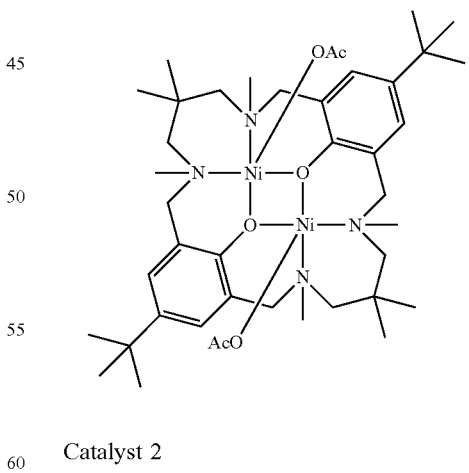

Catalyst 2

Example 5

Synthesis of [L²Ni₂(OAc)]—Catalyst 3

Catalyst [L³Ni₂(OAc)₂]—3 was prepared as per catalyst 1 except using a mono-methylated macrocyclic ligand.

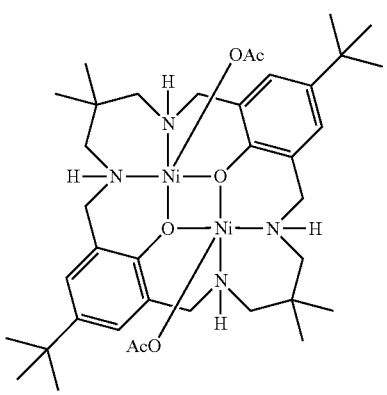

Catalyst 3

Example 6

Polymerisation Reaction 7 mg of DMC catalyst A and 165 mg of $[L^1Ni_2(OAc)_2]$ were taken into a 100 mL oven dried reactor. The catalyst combination was dried at 110-120° C. under vacuum for 1-2 hours. The reactor was cooled down to room temperature and propylene oxide (PO; 15 mL) was injected into the vessel via a syringe under continuous flow of $CO_2$ gas. The vessel was heated to 80° C. and 25 bar $CO_2$ pressure was added. The reaction was continued at 80° C. for 3 hours. Once the reaction was finished, the reactor was cooled to below 10° C. and the pressure was released very slowly. NMR and GPC were measured immediately. The crude reaction mixture was pour/diluted in $CH_2C_2$ and HCl/MeOH was added.

The reaction produced a polymer with an Mn of 44,000 and a polydispersity of 2.9. The polymer contained 53% carbonate linkages.

Example 7

1 mg of DMC catalyst B was taken into a 100 mL oven dried reactor. The catalyst combination was dried at 110-120° C. under vacuum for 1-2 hours. The reactor was cooled down room temperature and a solution of catalyst 2 (36 mg) in propylene oxide (PO; 10 mL) was injected into the vessel via a syringe under continuous flow of $CO_2$ gas. 5 mL ethyl acetate was added. The vessel was heated to 75° C. and 10 bar $CO_2$ pressure was added. The reaction was continued at 75° C. overnight. Once the reaction was finished, the reactor was cooled to below 10° C. and the pressure was released very slowly. NMR and GPC were measured immediately.

The reaction produced a polymer with an Mn of 33,800, and Mw of 248,000 and a polydispersity of 7.35. The polymer contained 33% carbonate linkages.

Example 8

To an oven-dried 100 mL reactor was added a required amount of DMC catalyst om and the catalyst dried at 120° C. for 1 hour under vacuum. The reactor was cooled to room temperature and a propylene oxide solution of catalyst 2 or 3 was injected via a syringe under continuous flow of $CO_2$ gas. Anhydrous EtOAc, if required, was injected via syringe under continuous flow of $CO_2$ gas. The vessel was heated to the initial reaction temperature with constant agitation at 600 rpm and 10 bar $CO_2$ pressure added. The reaction was continued at this temperature for the defined number of hours. The temperature was then increased, and the reaction continued for a total of 16 hours. Once the reaction was finished, the reactor was cooled to below 10° C. and the pressure released very slowly. NMR and GPC were measured immediately. All reactions resulted in >98% PO conversion.

The results of Example 8 are shown in Table I below:

TABLE 1

| Cat | Loading (mol. %) | DMC (g) | PO (mL) | EtOAc (mL) | $T_{initial}$ (° C./ hr) | $T_{final}$ (° C./ hr) | Selectivity (%) | Carbonate: ether | $M_n$ (kg mol$^{-1}$) | $M_w$ (kg mol$^{-1}$) | PDI |
|---|---|---|---|---|---|---|---|---|---|---|---|
| 3 | 0.03 | 0.002 | 5 | 10 | 60 (4) | 85 (12) | 84 | 51:49 | 113 | 275 | 2.43 |
| 3 | 0.03 | 0.003 | 10 | 5 | 60 (8) | 85 (8) | 91 | 70:30 | 60 | 286 | 4.79 |
| 3 | 0.01 | 0.001 | 10 | 10 | 60 (8) | 75 (8) | 95 | 57:43 | 43 | 240 | 5.58 |
| 3 | 0.03 | 0.002 | 12.5 | 2.5 | 65 (4) | 85 (12) | 93 | 27:73 | 154 | 270 | 1.76 |
| 2 | 0.03 | 0.003 | 10 | 5 | 60 (4) | 85 (12) | 93 | 56:44 | 47 | 246 | 5.26 |
| 2 | 0.03 | 0.003 | 10 | 5 | 60 (8) | 85 (8) | 92 | 69:31 | 57 | 266 | 4.65 |
| 2 | 0.02 | 0.002 | 10 | 5 | 60 (4) | 85 (12) | 88 | 44:56 | 38 | 210 | 5.59 |
| 2 | 0.01 | 0.001 | 10 | 10 | 60 (8) | 75 (8) | 95 | 45:55 | 77 | 310 | 4.02 |
| 2 | 0.03 | 0.002 | 12.5 | 2.5 | 65 (4) | 85 (12) | 97 | 26:74 | 301 | 406 | 1.35 |

Example 8 demonstrates that a broad range of polycarbonate contents can be produced from this dual catalysis and that high molecular weight polymers, with Mw up to 400,000 can be produced, all at just 10 bar pressure. The polymers are produced with broad polydispersities which are beneficial for many thermoplastic applications. The carbonate content can be manipulated by temperature, catalyst loading, pressure etc.

The invention claimed is:

1. A method for preparing a high molecular weight polyether carbonate, the method comprising reacting carbon dioxide and an epoxide in the presence of a double metal cyanide (DMC) catalyst and a catalyst of formula (I), wherein the catalyst of formula (I) has the following structure:

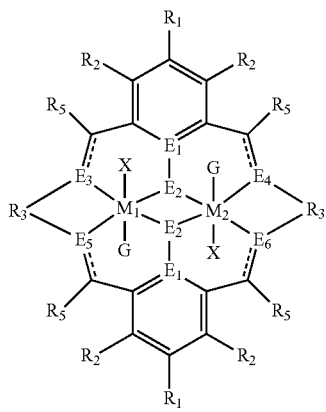
(I)

wherein $M_1$ and $M_2$ are independently selected from Zn(II), Cr(III) Co(II), Cu(II), Mn(II), Mg(II), Ni(II), Fe(II), Ti(II), V(II), Cr(III)—X, Co(III)—X, Mn(III)—X, Ni(III)—X, Fe(III)—X, Ca(II), Ge(II), Al(III)—X, Ti(III)—X, V(III)—X, Ge(IV)—(X)$_2$ or Ti(IV)—(X)$_2$;

$R_1$, and $R_2$ are independently selected from hydrogen, halide, a nitro group, a nitrile group, an imine, an amine, an ether group, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

$R_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or hetcroalicyclic;

$R_5$ is independently selected from H, or optionally substituted aliphatic, heteroaliphatic, alicyclic, heteroalicyclic, aryl, heteroaryl, alkylheteroaryl or alkylaryl;

$E_1$ is C, $E_2$ is O, S or NH or $E_1$ is N and $E_2$ is O;

$E_3$, $E_4$, $E_5$ and $E_6$ are selected from N, NR$_4$, O and S, wherein when $E_3$, $E_4$, $E_5$ or $F_6$ are N, ═, is ─, and wherein when $E_3$, E4, $E_5$ or $E_6$ are NR$_4$, O or S, ═, is ─

$R_4$ is independently selected from H, or optionally substituted aliphatic, heteroaliphatic, alicyclic, heteroalicyclic, aryl, heteroaryl, alkylheteroaryl, -alkylC(O)OR$_{19}$ or -alkylC≡N or alkylaryl;

X is independently selected from OC(O)R$_x$, OSO$_2$R$_x$, OSOR$_x$, OSO(R$_x$)$_2$, S(O)R$_x$, OR$_x$, phosphinate, halide, nitrate, hydroxyl, carbonate, amino, amido or optionally substituted aliphatic, heteroaliphatic, alicyclic, heteroalicyclic, aryl or heteroaryl, wherein each X may be the same or different and wherein X may form a bridge between $M_1$ and $M_2$; R$_x$, is independently hydrogen, or optionally substituted aliphatic, haloaliphatic, heteroaliphatic, alicyclic, hetcroalicyclic, aryl, alkylaryl or heteroaryl; and G is absent or independently selected from a neutral or anionic donor ligand which is a Lewis base.

2. The method of claim 1 wherein the reaction is carried out at a pressure of between 1 bar and 60 bar carbon dioxide.

3. The method of claim 1, wherein $M_1$, and/or $M_2$ is selected from Mg(II), Zn(II), or Ni(II).

4. The method of claim 1, wherein X is independently selected from OC(O)R$^x$, OSO$_2$R$^x$, OS(O)R$^x$, OSO(R$^x$)$_2$, S(O)R$^x$, OR$^x$, halide, nitrate, carbonate, amino, nitro, amido, alkyl, heteroalkyl, aryl or heteroaryl, and/or R$^x$ may be optionally substituted alkyl, alkenyl, alkynyl, heteroalkyl, aryl, heteroaryl, cycloalkyl, or alkylaryl, wherein each X may be the same or different and wherein X may form a bridge between $M_1$ and $M_2$.

5. The method of claim 1, wherein the catalyst of formula (I) has a symmetric macrocyclic ligand.

6. The method of claim 1, wherein the catalyst of formula (I) has an asymmetric macrocyclic ligand.

7. The method of claim 6, wherein $E_3$, $E_4$, $E_5$ and $E_6$ are NR$_4$, wherein at least one occurrence of $E_3$, $E_4$, $E_5$ and $E_6$ is different to the remaining occurrence(s) of $E_3$, $E_4$, $E_5$ and $E_6$ are.

8. The method of claim 1, wherein $E_3$, $E_4$, $E_5$ and $E_6$ are NR$_4$, wherein each R$_4$ is independently H or optionally substituted aliphatic.

9. The method of claim 1, wherein $E_1$ is C, and $E_2$ is O.

10. The method of claim 1, wherein $R_5$ is H and wherein $R_2$ is H.

11. The method of claim 1, wherein $R_3$ is an optionally substituted alkylene group.

12. The method of claim 1, wherein $R_1$ is independently selected from hydrogen, halide, amino, nitro, sulfoxide, sulfonyl, sulfinate, and an optionally substituted alkyl, alkenyl, aryl, heteroaryl, silyl, silyl ether, alkoxy, aryloxy or alkylthio.

13. The method according to claim 1, wherein the catalyst is of the formula:

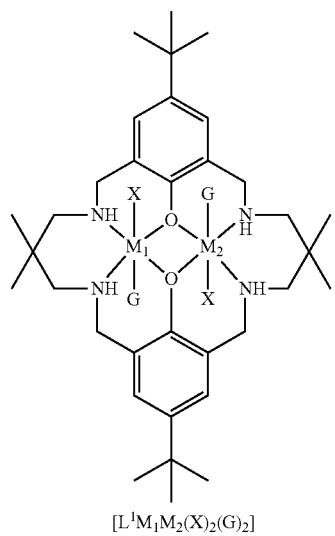

[L$^1$M$_1$M$_2$(X)$_2$(G)$_2$]

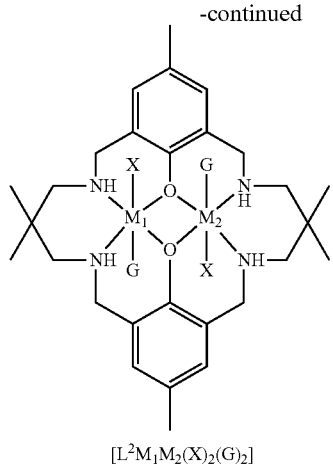
[L²M₁M₂(X)₂(G)₂]
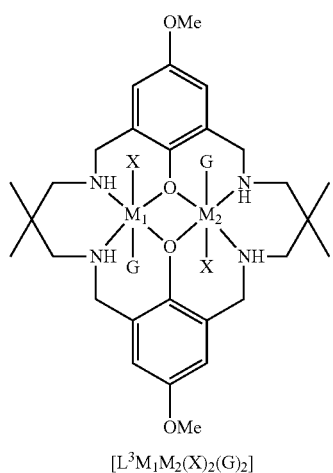
[L³M₁M₂(X)₂(G)₂]
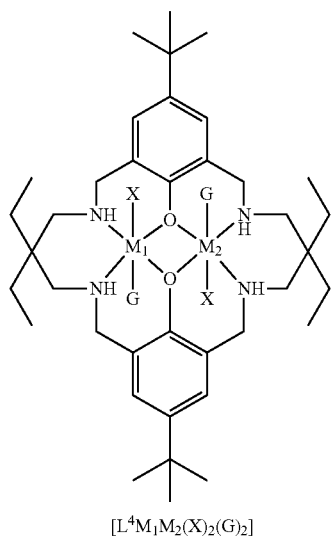
[L⁴M₁M₂(X)₂(G)₂]
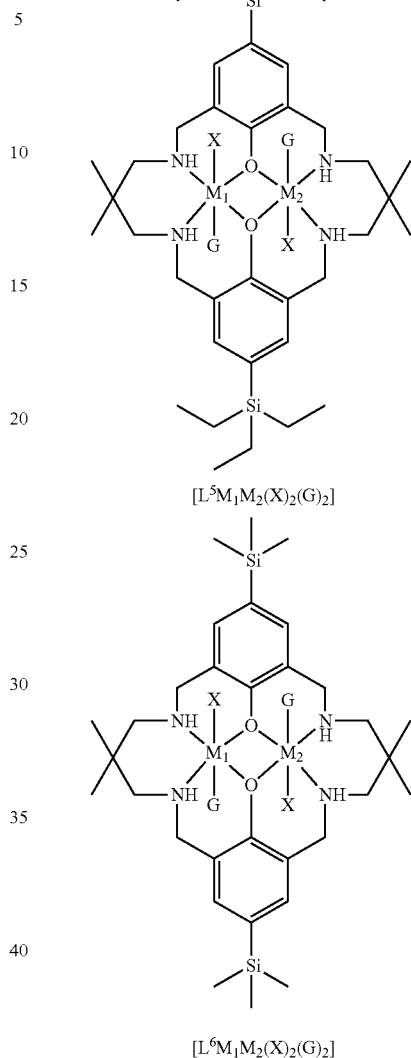
[L⁵M₁M₂(X)₂(G)₂]
[L⁶M₁M₂(X)₂(G)₂]
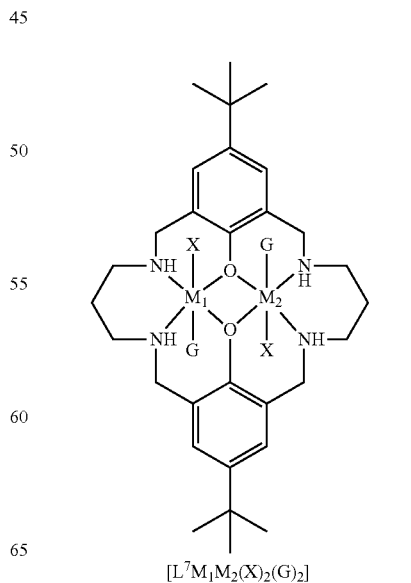
[L⁷M₁M₂(X)₂(G)₂]

53
-continued
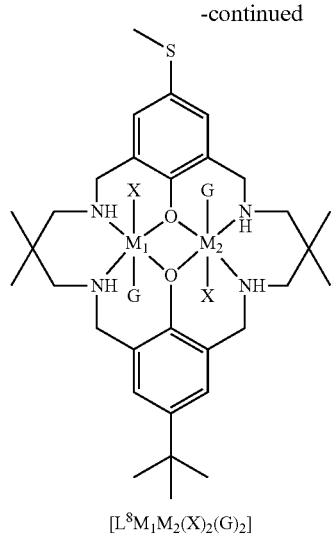
[L⁸M₁M₂(X)₂(G)₂]
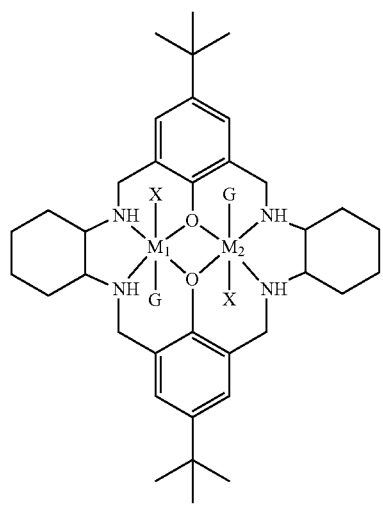
[L⁹M₁M₂(X)₂(G)₂]
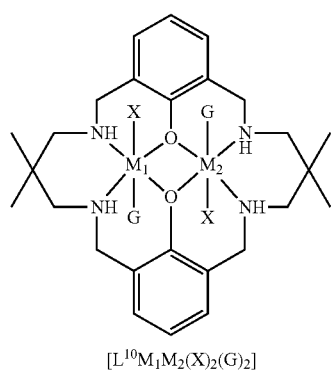
[L¹⁰M₁M₂(X)₂(G)₂]
54
-continued
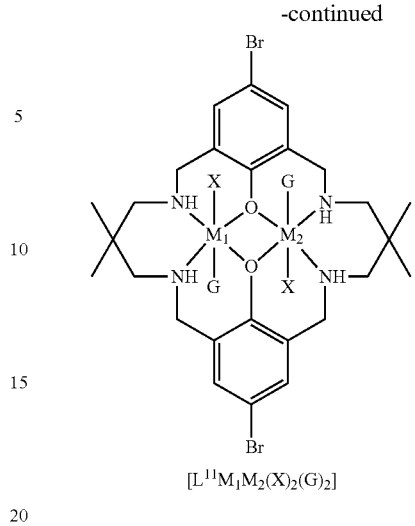
[L¹¹M₁M₂(X)₂(G)₂]
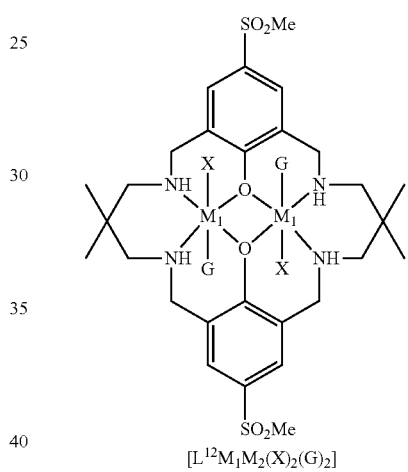
[L¹²M₁M₂(X)₂(G)₂]
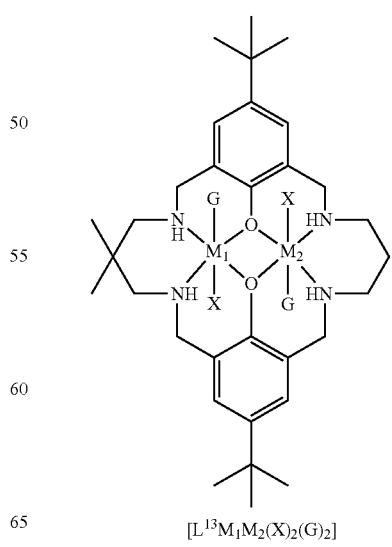
[L¹³M₁M₂(X)₂(G)₂]

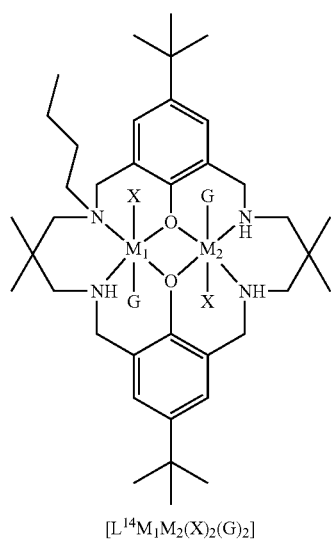
[L¹⁴M₁M₂(X)₂(G)₂]
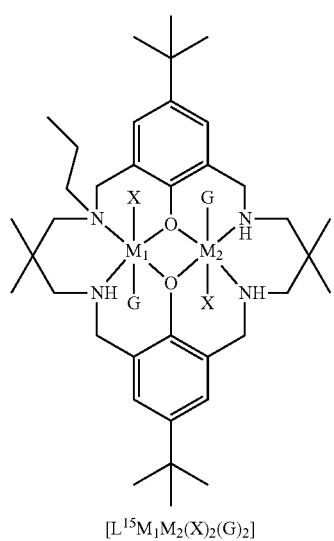
[L¹⁵M₁M₂(X)₂(G)₂]
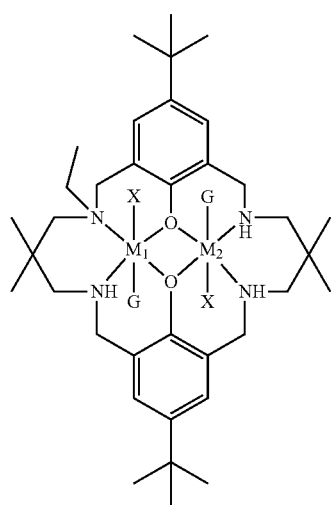
[L¹⁶M₁M₂(X)₂(G)₂]
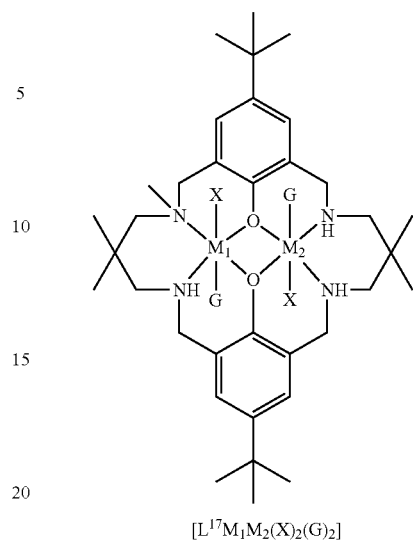
[L¹⁷M₁M₂(X)₂(G)₂]
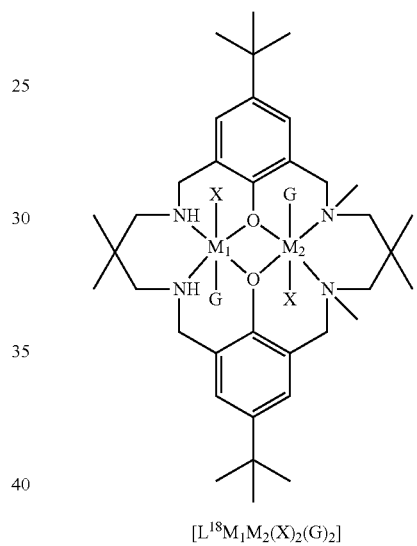
[L¹⁸M₁M₂(X)₂(G)₂]
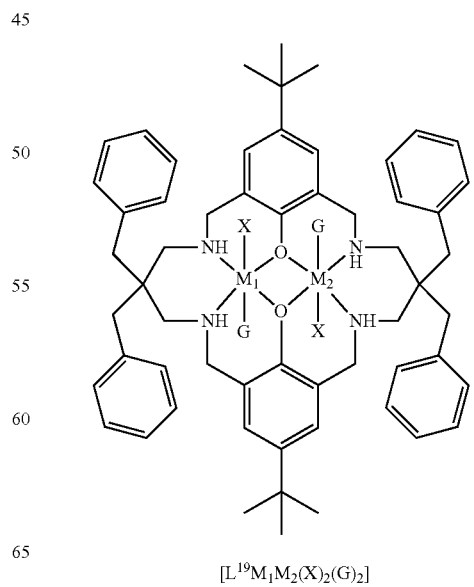
[L¹⁹M₁M₂(X)₂(G)₂]

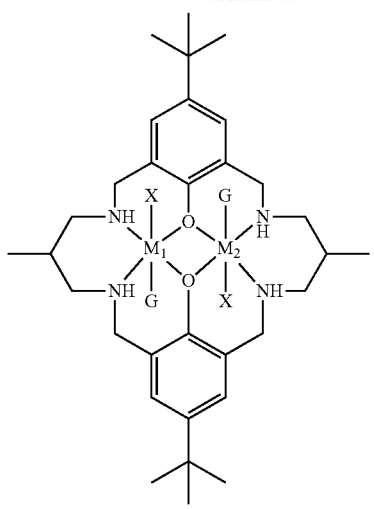

[L²⁰M₁M₂(X)₂(G)₂]

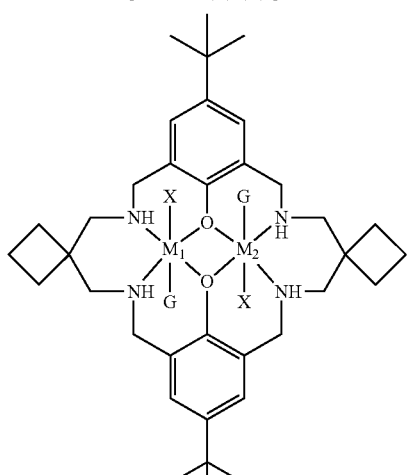

[L²¹M₁M₂(X)₂(G)₂]

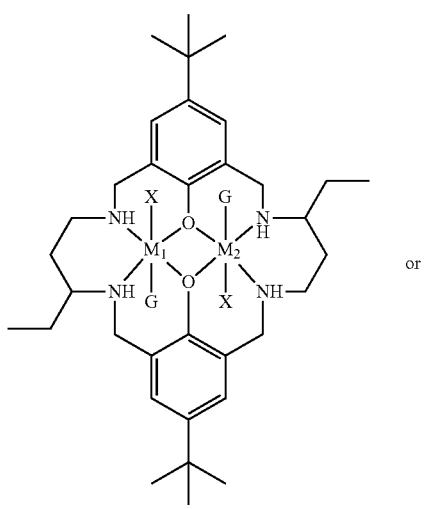

[L²²M₁M₂(X)₂(G)₂]

or

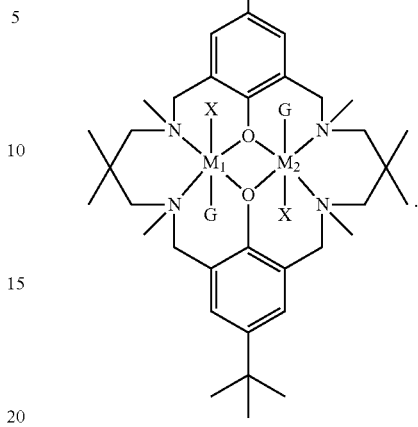

[L²³M₁M₂(X)₂(G)₂]

14. The method of claim 1, wherein the reaction is carried out at a temperature in the range of from about 50° C. to about 110° C.

15. The method of claim 1, wherein no starter or initiator compound is present in the reaction.

16. The method of claim 1, wherein the high molecular weight polyether carbonate has a molecular weight of at least about 25,000 Daltons.

17. The method of claim 1, wherein the DMC catalyst comprises at least two metal centres and cyanide ligands.

18. The method of claim 17, wherein the DMC catalyst additionally comprises at least one of: one or more complexing agents, water, a metal salt and/or an acid.

19. The method of claim 1, wherein the DMC catalyst is prepared by treating a solution of a metal salt with a solution of a metal cyanide salt in the presence of at least one of: complexing agent, water, and/or an acid, wherein the acid, if present, has the formula $H_rX'''$, where $X'''$ is an anion selected from halide, sulfate, phosphate, borate, chlorate, carbonate, cyanide, oxalate, thiocyanate, isocyanate, isothiocyanate, carboxylate and nitrate, and r is an integer corresponding to the charge on the counterion $X'''$.

20. The method of claim 19, wherein the DMC catalyst comprises the formula:

$M'_d[M''_e(CN)_f]_g$ wherein M' is selected from Zn(II), Ru(II), Ru(III), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), M" is selected from Fc(II), Fe(III), Co(II), Co(III), Cr(II), Cr(III), Mn(II), Mn(III), Ir(III), Ni(II), Rh(III), Ru(II), V(IV), and V(V), d, e, f and g are integers, and are chosen to such that the DMC catalyst has electroneutrality.

21. The method of claim 20 wherein M' is selected from Zn(II), Fe(II), Co(II) and Ni(II).

22. The method of claim 20 wherein M" is selected from Co(II), Co(III), Fe(II), Fe(III), Cr(III), Ir(III) and Ni(II).

23. The method of claim 1 wherein the polyether carbonate has the formula (IV):

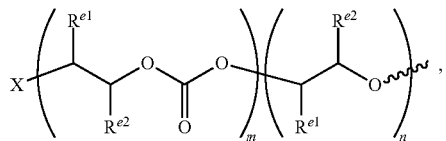

wherein X is independently selected from $OC(O)R_x$, $OSO_2R_x$, $OSOR_x$, $OSO(R_x)_2$, $S(O)R_x$, $OR_x$, phosphinate, halide, nitrate, hydroxyl, carbonate, amino, amido or optionally substituted aliphatic, heteroaliphatic, alicyclic, heteroalicyclic, aryl or heteroaryl, $R_x$ is independently hydrogen, or optionally substituted aliphatic, haloaliphatic, heteroaliphatic, alicyclic, heteroalicyclic, aryl, alkylaryl or heteroaryl, n and m are integers, and wherein m/(n+m) is from greater than zero to less than 1, and $R^{ej}$ and $R^{e2}$ depend on the nature of the epoxide used in the method.

24. The method of claim 1 wherein a polymerisation system for the copolymerisation of carbon dioxide and an epoxide, comprises:

a. the catalyst of formula (I), and
b. the DMC catalyst.

25. The method of claim 1 wherein a high molecular weight polyether carbonate is prepared.

26. The method of claim 25, wherein the high molecular weight polyether carbonate has n ether linkages and m carbonate linkages, wherein n and m are integers.

27. The method of claim 23, wherein $R^{e1}$ and $R^{e2}$ are independently selected from H, halogen, hydroxyl, or optionally substituted alkyl, alkenyl, alkynyl, cycloalkyl, heterocycloalkyl, aryl, heteroaryl, heteroalkyl or heteroalkenyl, or adjacent $R^{e1}$ and $R^{e2}$ groups may be taken together to form a saturated, partially unsaturated or unsaturated ring containing carbon and hydrogen atoms, and optionally one or more heteroatoms.

28. The method of claim 23, wherein $R^{e1}$ and $R^{e2}$ are independently selected from H or optionally substituted alkyl, or adjacent $R^{e1}$ and $R^{e2}$ groups may be taken together to form a five or six membered alkyl ring.

29. The method of claim 26, wherein m+n≥10, or m+n≥20, or m+n≥100, or m+n≥200, or m+n≥500, or m+n≥1,000.

30. The method of claim 25, wherein the PDT of the polymer is greater than 1.

* * * * *